US008340568B2

(12) United States Patent
Fadel et al.

(10) Patent No.: US 8,340,568 B2
(45) Date of Patent: Dec. 25, 2012

(54) METHOD AND SYSTEM FOR IMPROVING PERFORMANCE ON STANDARDIZED EXAMINATIONS

(75) Inventors: Tarek A. Fadel, Chicago, IL (US); Kingsley Martin, Chicago, IL (US)

(73) Assignee: Adaptigroup LLC, Chicago, IL (US)

( * ) Notice: Subject to any disclaimer, the term of this patent is extended or adjusted under 35 U.S.C. 154(b) by 155 days.

(21) Appl. No.: 12/495,245

(22) Filed: Jun. 30, 2009

(65) Prior Publication Data
US 2010/0003658 A1    Jan. 7, 2010

Related U.S. Application Data

(62) Division of application No. 11/056,862, filed on Feb. 11, 2005, now abandoned.

(60) Provisional application No. 60/544,657, filed on Feb. 14, 2004.

(51) Int. Cl.
G09B 11/00 (2006.01)
(52) U.S. Cl. .................. 434/350; 434/353; 434/365
(58) Field of Classification Search .................. 434/322, 434/323, 350, 362
See application file for complete search history.

(56) References Cited

U.S. PATENT DOCUMENTS

| | | | | |
|---|---|---|---|---|
| 5,618,182 A * | 4/1997 | Thomas | ......................... | 434/323 |
| 6,077,085 A * | 6/2000 | Parry et al. | ..................... | 434/322 |
| 6,118,973 A * | 9/2000 | Ho et al. | ........................ | 434/362 |
| 6,419,496 B1 * | 7/2002 | Vaughan, Jr. | .................. | 434/322 |
| 2002/0115048 A1* | 8/2002 | Meimer | ........................ | 434/322 |
| 2003/0044760 A1* | 3/2003 | Banerjee et al. | ............. | 434/350 |
| 2006/0121432 A1* | 6/2006 | Sun | ............................... | 434/322 |

* cited by examiner

*Primary Examiner* — Kathleen Mosser
(74) *Attorney, Agent, or Firm* — McAndres, Held & Malloy, Ltd.

(57) ABSTRACT

The method and system include presenting a user with a plurality of questions, timing the user's response time for the plurality of questions, identifying an optimal answer time where the user is able to answer a maximum percentage of questions correctly, and informing the user of the optimal answer time. An embodiment of the method may also include providing the user with a suggested change in an actual time taken to answer a question. Certain embodiments may also include weighting the chance of receiving a question in a particular topic based on the user's past performance in answering questions in that topic.

21 Claims, 16 Drawing Sheets

Figure 6 adaptibar be prepared    164  166  156

162 | home  questions  performance  settings  help  marketing  sales  my profile  logout Question 13 - Torts - Intentional Torts Stop Watch: 11.5 seconds

154

159 | Professor Merrill, in a lecture in her psychology course at a private university, described an experiment in which a group of college students in a neighboring city rushed out and washed cars stopped at traffic lights during rush hour. She described how people reacted differently-with shock, joy, and surprise. At the conclusion of her report, she said, "You understand, of course, that you are not to undertake this or any other experiment unless you first clear it with me." Four of Merrill's students decided to try the same experiment but did not clear it with Merrill.

One subject of their experiment, Carr said, " I was shocked. There were two people on each side of the car. At first I thought negatively. I thought they were going to attack me and thought of driving away. Then I quieted down and decided there were too many dirty cars in the city anyway."

158

Charitable immunity has been abolished in the jurisdiction.

If Carr asserts a claim agianst the students who washed his car, his best theory is 160b
Choose from the answers listed below:
160a 163 
- O A. assault.
- O B. negligence.
- O C. invasion of privacy.
- O D. false imprisonment.

( answer )  ( pass )  ( stop for now )

167  168  169    160d  160c

Figure 7 adaptibar be prepared home  questions  performance  settings  help | marketing | sales  my profile  logout Question 554 - Torts - Other Torts You answered D. The correct answer is B.

You answered this question in 3 seconds. Had you spent an additional 105 seconds reviewing the question and answers, then based on your prior performance, your chances of answering correctly would have increased from 0% to 27%.

The explanation for the answer is:

B provides the best theory of relief. Private nuisance is defined as a condition or activity that interferes with the possessor's use and enjoyment of his land to such an extent that the landowner cannot reasonably be expected to bear without compensation. The scope of interference is personal discomfort to the occupants and/ or tangible harm to land resulting in a diminution of its market value, which provides Palmco's best chance at recovering damages for its financial losses. Purely economic damages, without privity of party and contractually agreed liability, are generally not imposed in negligence or trespass actions, so A, C and D are incorrect. In addition, A will not prevail because the facts give no indication the stone crushing machine is abnormally dangerous, only noisy, so B is the best answer. A, C and D are incorrect.

---

The question was:

Palmco owns and operates a beachfront hotel. Under a contract with City to restore a public beach, Dedgeco placed a large and unavoidably dangerous stone-crushing machine on City land near Palmco's hotel. The machine creates a continuous and intense noise that is so disturbing to the hotel guests that they have canceled their hotel reservations in large numbers, resulting in a substantial loss to Palmco. Palmco's best chance to recover damages for its financial losses from Dredgeco is under the theory that the operation of the stone-crushing machine constitutes A. an abnormally dangerous activity
B. a private nuisance
C. negligence
D. a trespass (next question) (stop for now)

METHOD AND SYSTEM FOR IMPROVING PERFORMANCE ON STANDARDIZED EXAMINATIONS

RELATED APPLICATIONS

The present application is a division of U.S. application Ser. No. 11/056,862, filed Feb. 11, 2005, now abandoned, which, in turn, relates to, and claims priority from, U.S. Provisional Application No. 60/544,657, filed on Feb. 14, 2004, and entitled "Method and System for Improving Performance on Standardized Examinations." The applications noted above are hereby incorporated by reference in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to a computerized learning approach. In particular, the present invention relates to a system and method for improving performance on timed examinations.

Many standardized multiple choice tests exist, such as the Multistate Bar Examination ("MBE"), that rigorously test abilities in several different areas in a time-limited manner. For instance, the MBE tests six substantive areas of law with multiple-choice questions. The MBE forms a significant portion of the bar examination for most of the states in the United States. The ability of the test-takers to achieve a passing score on this portion of the bar examination is critical. It is the difference between being able to practice law in a particular state, and not. Consequently, those who desire to pass the bar examination spend a great deal of time studying for the MBE.

Known study approaches make use of written materials and rely on a user's discipline and drive to keep them working. Several bar review courses provide potential examinees with workbooks having several hundred practice questions that the user can work through as he/she sees fit. The workbooks also contain answers and explanations for the answers.

A major problem with these known and traditional approaches is that they do not, and cannot, force the user to study in a consistent, systematic and effective way. As a result, users typically study in a haphazard way, which varies with their mood, desire and drive. The danger with these conventional approaches is that users tend not to develop a consistent problem-solving approach, but instead develop and utilize inefficient and undesirable study habits. Another serious problem is that users also tend not to understand fully a question, and why one answer choice is correct, while the other choices are incorrect. Therefore, a method and system for preparing for an examination that assists a user to develop a consistent problem-solving approach and aids the user in understanding the question and answer is highly desirable.

Additionally, users preparing for a test may spend too much time or too little time preparing for a certain topic or subject that will be on the test. Doing practice questions from a written booklet may cause the user to answer repeatedly questions in areas where the student does not need additional work. If the booklet of questions is divided into sections, the user may study a section in the beginning of his/her preparation, but never revisit that section or the questions in the section as his/her preparation progresses. Therefore, a method and system for preparing for an examination that aids a user in efficiently preparing for a exam without ignoring topics the user has already mastered is highly desirable.

Another major problem is that test-takers may spend too little or too much time on a question when taking an actual exam or a practice exam. Generally, a test-taker has only a limited amount of time to answer each question on an exam. Spending too much time on a question means that the test-taker will not be able to spend enough time on a future question. Spending too little time on a question reduces the likelihood that the test-taker properly read the question and reviewed the answer choices. Constantly checking how much time has elapsed may cause the test-taker to lose precious time when taking the exam. Therefore, a method and system for preparing for an examination that aids a user in developing skills to manage efficiently time on the examination is highly desirable.

Thus, there is a need for a method and a system for preparing a user for an examination that offers greater efficiency and effectiveness by allowing the user to study and prepare to take the test in a consistent, systematic, and timely way.

BRIEF SUMMARY OF THE INVENTION

A preferred embodiment of the present invention provides an improved method and system for improving performance on examinations. The method and system include presenting a user with a plurality of questions, timing the user's response time for the plurality of questions, identifying an optimal answer time where the user is able to answer a maximum percentage of questions correctly, and informing the user of the optimal answer time. An embodiment of the method may also include providing the user with a suggested change in an actual time taken to answer a question, wherein the suggested change in time is the optimal answer time minus the actual time taken to answer the question. The plurality of questions may be multiple choice questions with a plurality of answer choices, at least one of which is a correct answer. Furthermore, an embodiment of the method may also include providing a graph that illustrates what percentage of questions answered in a given period of time are answered correctly.

Certain embodiments may also include weighting the chance of receiving a question in a particular topic based on the user's past performance in answering questions in that topic.

BRIEF DESCRIPTION OF SEVERAL VIEWS OF THE DRAWINGS

FIG. 6 depicts an example of a user interface displaying a question, a plurality of answer choices, and a question timer on a user interface in accordance with an embodiment of the present invention.

FIG. 7 depicts an example of a user interface displaying a correct answer, whether a user got a question correct, the user's actual time spent on the question, a suggested change in actual time spent on the question, an estimated change in chances of getting the question correct, and explanations for the correct answer and why the other choices were incorrect according to an embodiment of the present invention.

Figure 1:
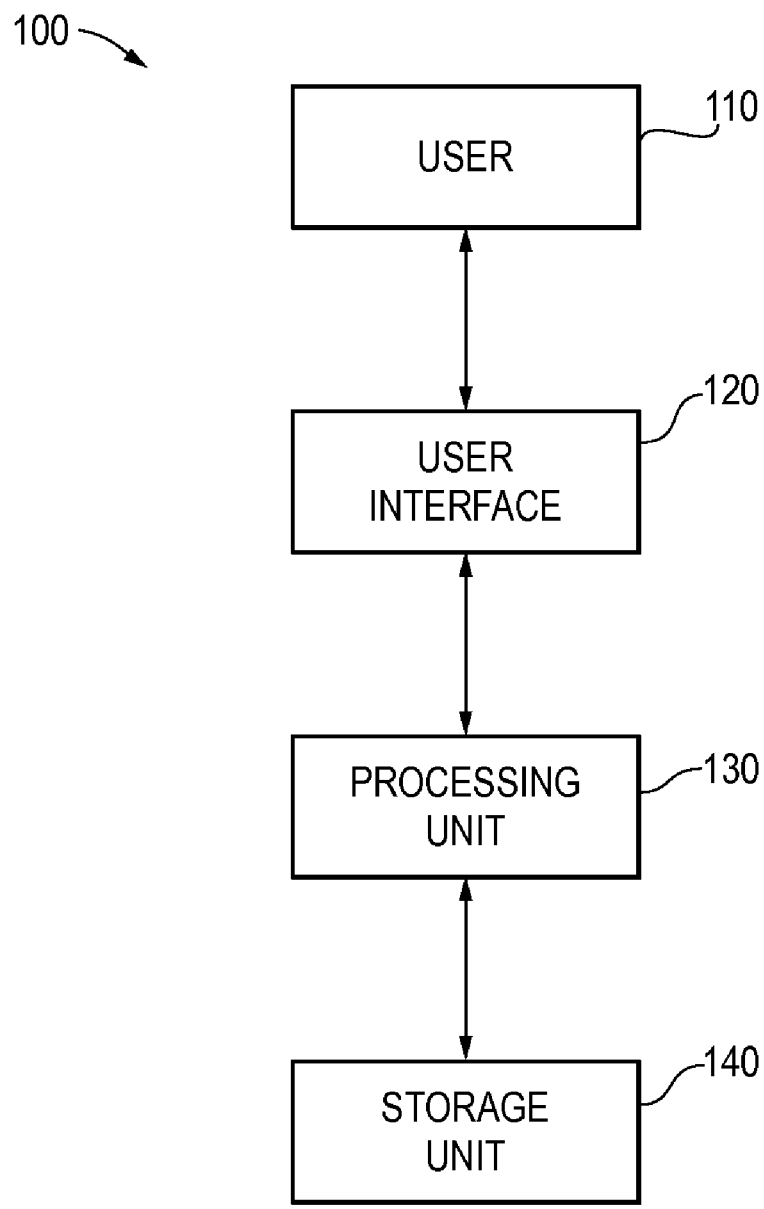
FIG. 1 illustrates an examination performance analysis and improvement system in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

For the purpose of illustration only, the following detailed description references a certain embodiment of a Multistate Bar Examination ("MBE") performance analysis improvement system and method. It is understood that the present invention may be used with other test performance analysis and improvement systems, such as performance improvement systems for the certified public account ("CPA") examination, the Law School Admission Test ("LSAT"), the real estate examination, the patent bar examination, medical boards, nursing boards, dental boards, social work licensing examinations, the ACT examination, the SAT examination, and other examinations, for example.

FIG. 1 illustrates an examination performance analysis and improvement system 100 according to an embodiment of the present invention. The examination performance analysis and improvement system 100 includes a user interface 120, a processing unit 130, and a storage unit 140.

The user 110 is anyone using system 100, such as a student preparing for the MBE, for example.

The user interface 120 receives input from and/or transmits output to a plurality of sources, such as the user 110 (for example, a student) and the processing unit 130. The user interface 120 includes any device capable of transmitting and receiving data to a user. For example, the user interface 120 includes desktop personal computers, touchscreens, personal digital assistants (PDAs), laptop personal computers, or any Internet-enabled computer or device.

The processing unit 130 receives input from and/or transmits output to a plurality of sources, such as user the interface 120 and the storage unit 140. The processing unit 130 includes any device whether in hardware or software that can be configured to perform the functions of the processing unit 130 described herein. Moreover, the processing unit 130 includes any current processors currently known to one of ordinary skill in the art, whether implemented in hardware or software. For example, processing unit can include an Internet-enabled server, personal desktop, or laptop computer.

The storage unit 140 includes disk drives, removable memories, such as "flash memories," hard disk drives, any internal storage on a computer or Internet server, and any device whether in hardware or software that can be configured to perform the functions of the storage unit.

The user interface 120, the processing unit 130, and the storage unit 140 may be implemented in hardware or software as single system, for example, as a personal desktop or laptop computer or a specialized processing system, or may be implemented in separate networked systems, for example. For example, the user interface 120 may be a personal computer, and the processing unit 130 and storage unit 140 may be combined in an Internet server or separate in multiple Internet servers that communicate with user interface 120. Alternatively, for example, the user interface 120, the processing unit 130, and the storage unit 140 may all be in the same personal computer. In another embodiment, the user interface 120, the processing unit 130, and the storage unit 140 may each be distributed among a multitude of systems. The user interface 120, the processing unit 130, and the storage unit 140 may communicate via known and established wired and/or wireless communication methods, including network connections and the Internet.

In operation, the user 110 enrolls in a preparation program for a test by sending registration information through the user interface 120 to the processing unit 130. The user 110 sends payment information, such as credit card information, checking account numbers, or some other form of payment information, for example, through the user interface 120 to the processing unit 130. Alternatively, the user 110 may mail this information to an operator that operates the processing unit 130. The operator may then enter the payment information into the processing unit 130. The processing unit 130 then stores the registration information and payment information in the storage unit 140. After verifying that an appropriate payment has been made, the processing unit 130 may then send a username 145 and password 150 to the user 110 through the user interface 120. In an alternate embodiment, the user 110 may purchase software or hardware and load or install the software or hardware into a processing unit.

The username 145 may become active a set time before a scheduled administration of the test for which the program is preparing user 110. For example, the username 145 may become active on December 1st if the user 110 is registered for the February MBE, or on May 1st if the user 110 is registered for the July MBE. After the username 145 becomes active, the user 110 may log into the processing unit 130 by using the user interface 120.

The storage unit 140 stores a set of questions 142 from the tests for which the user 110 is registered for each improvement program. For example, storage unit 140 may store practice questions licensed from the National Conference of Bar Examiners ("NCBE"). All the questions may be unoriginal, for example, thereby allowing user 110 to have greater confidence in the accuracy of the practice questions and their similarity to actual MBE questions. In an embodiment, the licensed questions may be derived from previously administered MBEs, chosen by the NCBE. The questions may be a multitude of types, such as multiple choice, true false, short answer, or other formats for example.

In addition, the storage unit 140 stores pluralities of answer choices 144 that correspond to each of the questions contained in the set of questions 142, correct answers 146 that correspond to each question stored in the set of questions 142, and explanations for the correct answers 148, which include a discussion of why the rest of the choices are incorrect. Additionally, the questions may fall in different categories of major topics and subtopics. The major topic 150 and subtopic 152 areas for each question may also be stored in the storage unit 140. For example, the MBE covers six major topic areas of law: Torts, Contracts, Constitutional Law, Evidence, Real Property, and Criminal Law. The subtopics are part of the major topics. For example, Constitutional Law may have four subtopics: Individual Rights, Judicial Review, Relations Between Federal and State Governments, and Separation of Powers. The subtopic of a question may also be stored in the storage unit 140. For example, if the question concerned First Amendment rights, the storage unit 140 may store the question 142, the plurality of answer choices 144, the correct answer 146, the explanation for the correct answer and why the other choices were incorrect 148, the major topic are 150: Constitutional Law, and the subtopic area 152: Individual Rights. It will be understood that multiple categorizations for each question may be stored in the storage unit 140. The above-described information may be stored as an array or as a database.

Figure 13:
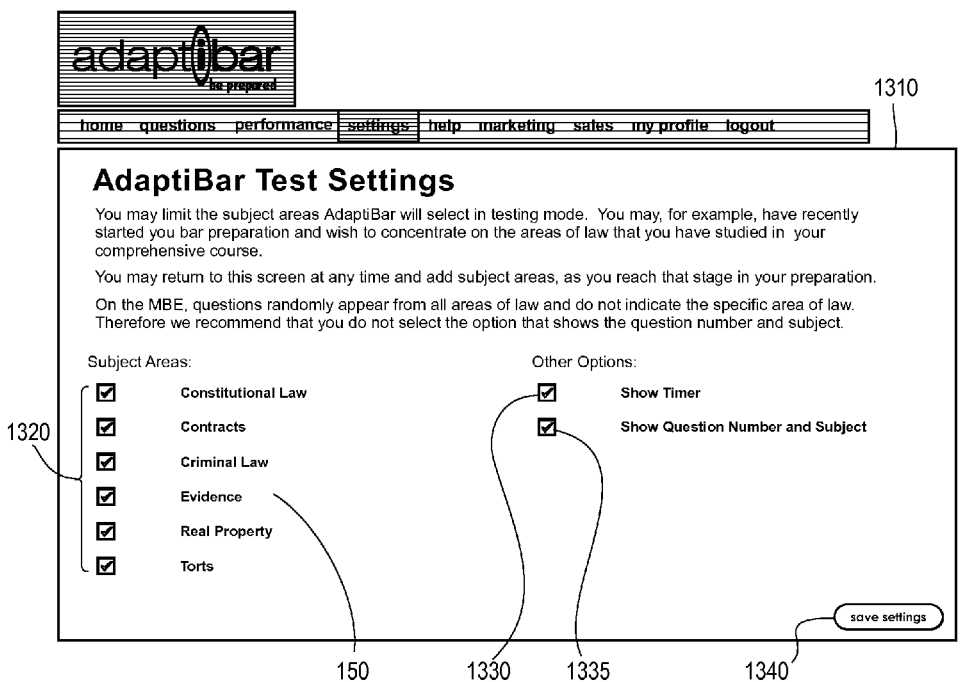
FIG. 13 depicts an example of a settings menu in accordance with an embodiment of the present invention.

Because the user 110 may be studying and learning different subjects at different times, the system 100 allows the user 110 to choose the subject areas in which the user wishes to receive questions. As shown in FIG. 13, processing unit 130 may begin the preparation program by presenting to user 110 through user interface 120 a settings menu 1310 that includes topic selection boxes 1320, where each topic selection box corresponds to a major topic 150 from which the user 110 can receive questions, "show timer selection" box 1330 and "show question and number selection" box 1335, and a "save settings" button 1340.

Using the user interface 120, the user 110 selects the major topics 150 from on which to receive questions by selecting the topic selection box 1320 that corresponds to the desired major topic 150. If the user 110 wishes the elapsed time to be displayed on the user interface 120 while answering a question, then the user 110 may activate that function by selecting the "show timer" selection box 1330. If the user 110 wishes the "question number and subject" to be displayed, then the user 110 may activate that function by selecting the "show question number and subject selection box 1330. The user 110 saves his/her settings by clicking on the "save selections" button 155. The settings are saved in the storage unit 140. The user's 100 selections are communicated to the processing unit 130, which then randomly selects a displayed question 154 from the set of questions 142 that corresponds to the selected major topics 150. The question is selected using the method for adaptive learning, which randomly selects questions for a user preparing for an examination from topics with weighted ranges, described below and in FIG. 15.

In an alternative embodiment, the processing unit 130 may also present user 110 with the option of restricting the subtopics from which the questions are chosen. For example, user 110 using the user interface 120 selects the subtopics 152 from which to receive questions by placing a checkmark in the subtopic selection box 1322 that corresponds to the desired subtopic 152 and clicking on the "save selections" button 1345. The settings are saved in the storage unit 140. The user's 100 selections are communicated to the processing unit 130, which randomly selects a displayed question 154 from the set of questions 142 that corresponds to the selected subtopics 152. The question is selected using the method for adaptive learning, which randomly selects questions for a user preparing for an examination from topics with weighted ranges, described below and in FIG. 15.

As shown in FIG. 6, for example, the user interface 120 receives the displayed question 154 from the processing unit 130 and displays it for the user 110. Displayed question 154 includes a question identifier 156, text of question 158, a time indicator 159, and question answer choices 160*a*, 160*b*, 160*c*, and 160*d*. In an embodiment, question identifier 156 includes question number 162, major topic indicator 164, and subtopic indicator 166. Displayed question 154 further includes an "answer" button 167, a "pass" button 168, and a "stop for now" button 169.

In an embodiment, the displayed question 154 is a multiple choice question, and the user 110 may cause the processing unit 130 to reduce the emphasis of a particular answer choice 160 on the user interface 120 by inputting a selection on the user interface 120. The emphasis may be reduced in a multitude of ways, such as by turning the answer choice a faded gray, unhighlighting an answer choice, reducing the font of an answer choice, unbolding an answer choice, italicizing an answer choice, or another change in the appearance of the answer choice on the user interface 120, for example. For example, the user 110 may accomplish this by clicking with a mouse on the answer choice instead of a check box next to the answer choice on the user interface 120. This allows the user 110 to eliminate answers from the possible choices. This emulates the process in which a user would engage when taking a handwritten exam or practice questions and crossing out certain answers that the user 110 feels are incorrect. Even if the user 110 chooses to eliminate a particular answer choice 160 by reducing its emphasis, however, the user 110 may still choose that answer as correct and submit that answer.

The user 110 selects an answer choice 160 on the user interface 120 by selecting the answer indicator 163 that corresponds to that respective answer choice and by selecting the "answer" icon. The user interface 120 communicates the selected answer choice to the processing unit 130. The processing unit 130 stops timing the answer and stops the time indicator 159 displayed to the user 110 through the user interface 120. The processing unit 130 stores how long the user 110 took to answer the question in the storage unit 140. The processing unit 130 retrieves the correct answer 146 to the displayed question 154 from the storage unit 140. The processing unit 130 then compares the selected answer choice and the correct answer 146 to see if the answer is correct or incorrect. The processing unit 130 stores whether the answer is correct in the storage unit 140.

The processing unit 130 times how long the user 110 takes to answer each displayed question 154. If the user has activated the "show timer" function on the settings menu 1310, the processing unit 130 communicates the elapsed time at set time intervals to the user interface 120 for display to the user 110 through time indicator 159 while the user 110 is answering the displayed question 154. The set intervals may be any amount of time, such as seconds, minutes, hours, or a fraction thereof, for example.

To display the elapsed time through time indicator 159, user interface 120 may display the time to the user 110 in a multitude of ways, such as presenting a graphical representation of a clock, a graphical representation of an hour glass, a bar graph, or a digital timer, for example, that times how long the user 110 takes to answer a question, as shown in FIG. 6, for example. Alternatively, the user interface 120 may present a graphical representation of a clock or dial that rotates according to increases in elapsed time. For an embodiment, see discussion of FIG. 2 and method 200, below.

As shown in FIG. 7, after the user 110 has answered a question, the processing unit 130 communicates answer data 171 to the user interface 120 for display to the user 110. Answer data includes a question identifier 156, a time to answer indicator 170, an answer indicator 172, an explanation indicator 176, and a question repeater 177. The time to answer indicator 170 indicates displays how long it took the user to answer the question. The answer indicator 172 displays the correct answer to the answered question. The explanation indicator 176 displays an explanation of why the answer is correct and why the other choices are incorrect. If, for example, the question is a multiple-choice question with four choices, the processing unit 130 displays through the user interface 120 to the user 110 why the other three answers are incorrect. The question repeater 177 repeats the text of question 158 and question answer choices 160a, 160b, 160c, and 160d.

The processing unit 130 also calculates an optimal answer time ("OAT") 600, which is the optimal amount of time that the user 110 should spend on each question. The processing unit 130 calculates an OAT 600 by using a series of steps, such as in FIG. 4 and FIG. 5, for example (see below for a detailed description of certain embodiments). The processing unit 130 then communicates the OAT 600 to the user interface 120 for display to the user interface 110.

The processing unit 130 also calculates the difference between time actually spent on answering a given question and the OAT and calculate the user's 110 difference in the percentage of correct answers given for those two times in the past from the user 110. The processing unit 130 displays an additional time indicator 178 to the user 110 through the user interface 120 which indicates the amount of additional time the user 110 should have spent reviewing the problem before answering and how much the user's 110 chance of answering the question correctly would have increased, such as in FIG. 7, for example. By giving the user 110 this type of feedback, the user 110, through practice, may begin to develop internal timing which may assist the user 110 in performing better on the actual exam for which the user 110 is preparing.

In an alternative embodiment, the processing unit 130 may also compute and communicate to the user interface 120 for display to the user 110 an average answer time of all the users who have answered the question correctly, either historically or for that session of the examination. Alternatively, the processing unit 130 may also compute and communicate to the user interface 120 for display to the user 110 the average time of all users, either historically or for that examination session, that have answered the question regardless of whether their answer was correct.

In an embodiment, processing unit 130 may retrieve all the answers to this question given by all the users of the program from the data storage 140 and then find the percentage of correct answers. In an alternative embodiment, processing unit 130 may retrieve the answers to this question via wireless and/or wired communication with all the users' data storage unit, such as user's storage unit 140, or with a centralized data storage unit and find the percentage of correct answers.

Answer data 171 also includes two icons—"next question" button 180 or "stop for now" button 182—available to the user 110. The user 110 may spend as much time as necessary to read the explanatory answer and then chose to continue to the next question by selecting "next question" icon 180 through the user interface 120 or to quit the program by selecting "stop for now" icon 182 through the user interface 120. When the user 110 selects an icon, the user interface 120 then communicates the user's 110 selection to the processing unit 130.

If the user 110 selects the "stop for now" icon 182, then the processing unit 130 stores in the storage unit 140 user data 112, such as the questions the user 110 has answered already, the times the user 110 took to answer the questions, the answers user 110 gave, and whether the answers user 110 gave were correct. If the user 110 selects the "next question" icon 180, the processing unit 130 randomly selects another question from the set of questions 142 stored in the storage unit 140, and then communicates the question to the user interface 120 for display to the user 110 using the method 1500 described below and in FIG. 15.

Figure 8:
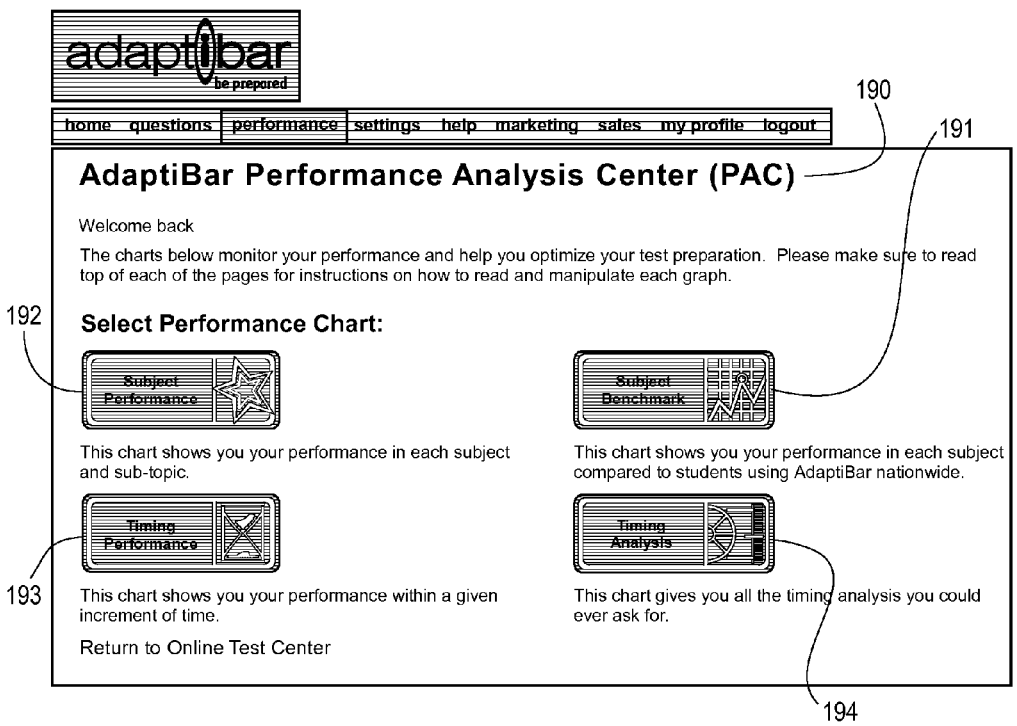
FIG. 8 depicts an example of a toolbar offering a user several modes of reviewing the user's performance in accordance with an embodiment of the present invention.

The system 100 also provides several analysis and performance tools. The user 110 selects "performance" through a toolbar displayed on the user interface 120, such as in FIG. 8, for example. If the user 110 selects "performance" using the user interface 120, the user interface 120 communicates the user's 110 choice to the processing unit 130. In an embodiment, the processing unit 130 then communicates to the user interface 120 for display to the user 110 a performance analysis center (PAC) that includes four button: (1) "subject benchmark" button 191; (2) "subject performance" button 192; (3) "timing performance" button 193; and (4) "timing analysis" button 194, such as in FIG. 8, for example.

Giving the user 110 an opportunity to review an analysis of his/her performance allows the user to develop and utilize efficient and desirable study habits. The instant feedback may save the user 110 time, because the user 110 does not need to go back and review answers after completing an entire practice test. Additionally, the user 110 may not be able to devote a three-hour block of time to take a practice test for the MBE, for example. The user 110 is still able to time himself/herself taking the test because each individual question is timed and recorded in an effort to make sure the user 110 does not run out of time on the actual examination.

If the user 110 selects the "subject benchmark" icon, the user interface 120 communicates the user's 110 choice to the processing unit 130. The processing unit 130 retrieves from the storage unit 140 user data 112, which contains an identification of each question answered by user 110, an indication of whether the user 110 answered each question correctly, and the major topic and subtopic from which each of the questions came. Then, the processing unit 130 calculates the total number of questions answered, the overall percentage of questions answered correctly, the percentage of questions answered correctly for each major topic and creates a subject benchmark chart 700, which visually displays the percentage of questions answered correctly by the user 110 in each major topic as well as the average percentage of questions answered correctly by all users in each major topic. The processing unit 130 then communicates the subject benchmark chart to the user interface 120 for display to the user 110, such as in FIG. 9, for example. Also, see FIG. 3 and the description of FIG. 3 below for a description of how the processing unit 130 may create a subject benchmark chart.

Figure 9:
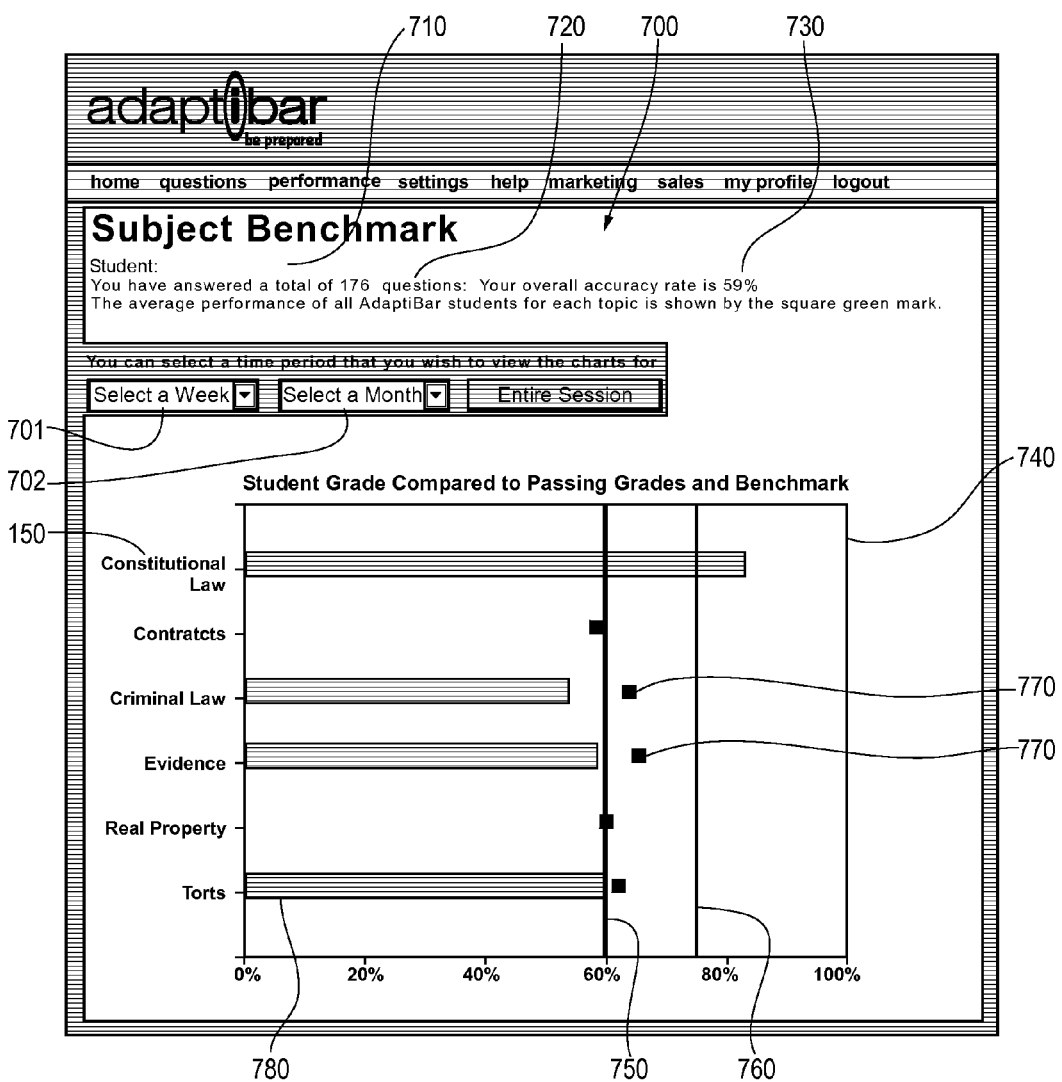
FIG. 9 depicts an example of a subject benchmark chart in accordance with an embodiment of the present invention.

As shown in FIG. 9, subject benchmark chart 700 includes a user indicator 710, a total number of questions answered indicator 720, an overall accuracy indicator 730, a graph field 740, a "Low Bar Passing Grade" indicator 750, and a "High Bar Passing Grade" indicator 760, and an average major topic accuracy indicator 770.

The user indicator 710 identifies the current user. The total number of questions answered indicator 720 displays the total number of questions answered by the user 110. The overall accuracy indicator 730 displays the overall percentage of questions answered correctly by the user 110. The graph field 740 displays a bar graph 780 for each major topic 150 that shows the user's 110 performance in each major topic 150. As shown in FIG. 9, each major topic 150 has a corresponding bar graph 780 next to it that represents the percentage of questions the user has answered correctly in that major topic 150.

In an alternative embodiment, only the user's 110 performance by major topic on the user interface 120 is displayed initially. If the user 110 selects any one of the major topics through the user interface 120, the processing unit 130 calculates the total number of questions answered, the overall percentage of questions answered correctly, the percentage of questions answered correctly for each major topic and subtopic and creates a new subject benchmark graph 700, which visually displays the percentage of questions answered correctly by the user 110 in each major topic and subtopic as well as the average percentage of questions answered correctly by all users in each major topic and subtopic. The processing unit 130 then communicates the subject benchmark chart 700 to the user interface 120 for display to the user 110.

As discussed above, the subject benchmark chart 700 also has an average major topic accuracy indicator 760 for each major topic that represents the average performance of all users of the program. This enables the user 110 viewing the subject benchmark chart 700 displayed on the user interface 120 to gauge his/her performance in comparison to all users enrolled in the program. In an embodiment, the users are the total number of users for that session of the examination. For example, all users studying for the February MBE. In another embodiment, the total users can be the total number of users to have used the system 100 to study for that particular examination. For example, all users that have studied for the MBE using the system.

In an embodiment, processing unit 130 retrieves from the storage unit 140 all the answers given by all the current users of the program for each major topic and sub-topic and then calculates the percentage of correct answers given for each major topic and sub-topic. In an alternative embodiment, processing unit 130 may retrieve the answers to questions in each major topic and sub-topic given by all the current users of the program via wireless and/or wired communication with all the users' storage units or with a centralized data storage unit.

In an alternative embodiment, the user 110 can select the time period for which a subject benchmark chart 700 is created and displayed. As shown in FIG. 9, subject benchmark chart 700 also includes a week drop-down box 701 and a month drop-down box 702. By using either drop-down box, the user can limit the time period for which the subject benchmark chart 700 is created. Once the user 110 has selected a specific time range, user interface 120 communicates user's 110 choice to processing unit 130. Processing unit 130 retrieves the user data 112 from the storage unit 140 and generates subject benchmark chart 700 and communicates to the user interface 120 for display to the user 110.

If the user 110 selects "subject performance" icon 192, the user interface 120 communicates the user's 110 choice to the processing unit 130. The processing unit 130 retrieves from the storage unit 140 user data 112, which contains an identification of each question answered by user 110, an indication of whether the user 110 answered each question correctly, and the major topic and subtopic from which each of the questions came. Then, the processing unit 130 calculates the percentage of correct answers for each major topic and each subtopic and creates a subject performance chart 800 indicating the percentage of correct answers for each major topic and each subtopic. The processing unit 130 then communicates the subject performance chart 800 to the user interface 120 for display to the user 110, such as in FIG. 10, for example.

Figure 10:
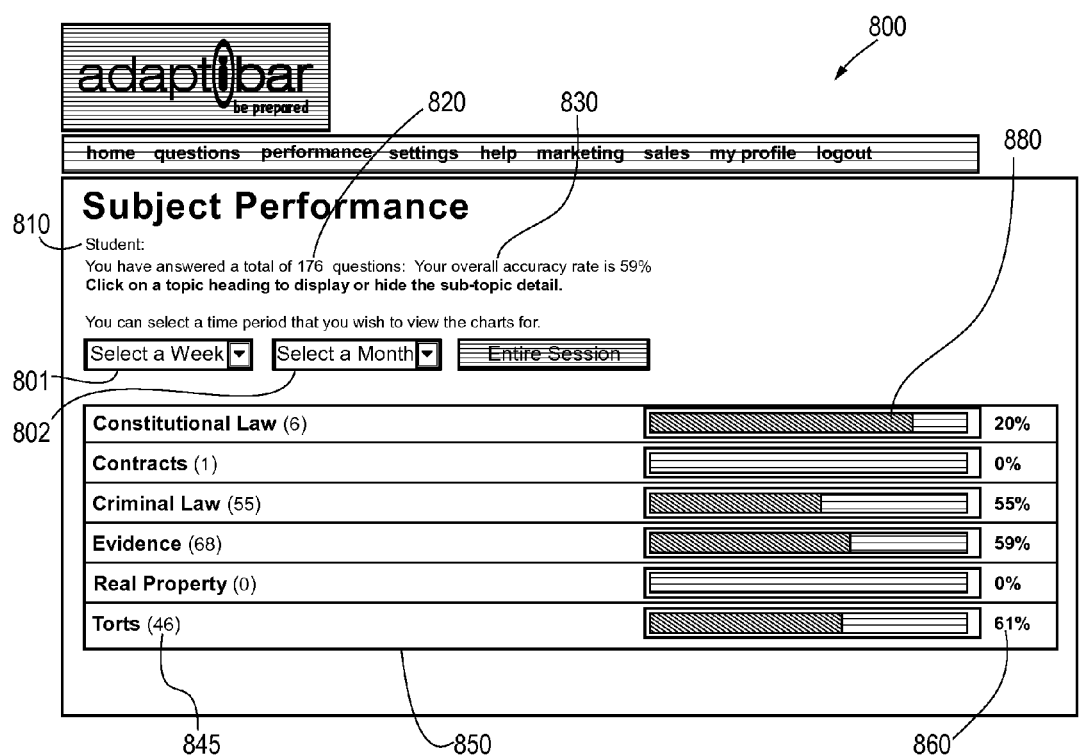
FIG. 10 depicts an example of a subject performance chart classified by major topic in accordance with an embodiment of the present invention.

As shown in FIG. 10, subject performance chart 800 includes a user indicator 810, a total number of questions answered indicator 820, an overall accuracy indicator 830, a total number of questions answered in each major topic indicator 845, a graph field 850, and a major topic accuracy indicator 860.

The user indicator 810 identifies the current user. The total number of questions answered indicator 820 displays the total number of questions answered by the user 110. The overall accuracy indicator 830 displays the overall percentage of questions answered correctly by the user 110. The total number of questions answered in each major topic indicator 845 displays the number of questions answered in each major topic 150. The graph field 850 displays a bar graph 880 that shows the user's 110 performance in each major topic 150, as shown in FIG. 10. Each major topic 150 has a corresponding bar graph next to it that represents the percentage of questions the user has answered correctly in that major topic 150. The major topic accuracy indicator indicates the percentage of questions answered correctly by the user 110 for that major topic. For example, in FIG. 10, the user 110 has answered 55% of the Criminal Law questions correctly.

Figure 14:
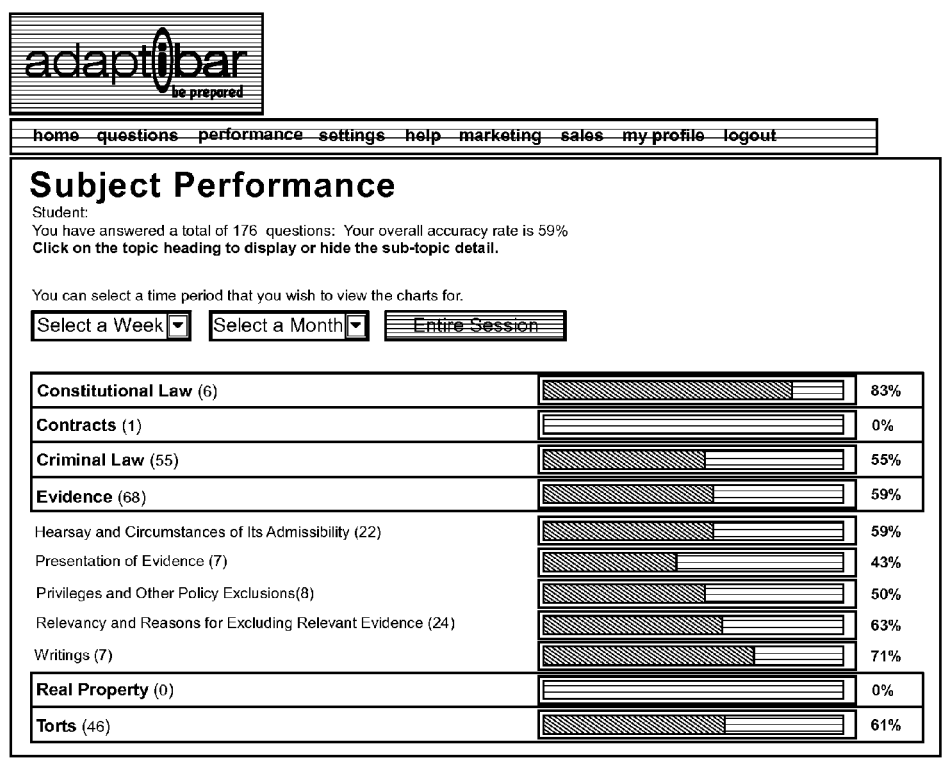
FIG. 14 depicts an example of a subject performance chart classified by major topic and subtopic in accordance with an embodiment of the present invention.

The subject performance chart 800 initially displays the percentage of questions answered correctly by the user 110 in each major topic. If the user 110 click on any major topics through the user interface 120, the processing unit 130 refreshes the user interface 120 and communicates the performance in the subtopics for all major topics that the user 110 has selected, as shown in FIG. 14.

In an embodiment, the user 110 may select a major topic by clicking on the major topic 150 identified on the subject performance chart 800. If the user 110 clicks on a major topic 150, the processing unit 130 generates a new subject performance chart 800 and communicates it to the user interface 120 for display to the user 110. For example, as shown in FIG. 14, the subject performance chart 800 displays the percentage of questions answered correctly by the user 110 in each subtopic under the major topic—"Evidence."

In an alternative embodiment, the user 110 may select a (+) symbol that is located near the major topic identifier. If the user 110 selects the "+" sign on the user interface 120, then the "+" sign may turn to a "−" sign and below the major topic selected may appear the subtopic areas for that major topic, for example. The average of the performances in each subtopic may make up the total percentage for the major topic. Alternatively, the percentage of all the questions answered correctly by the user 110 in the major topic may constitute the topic's total percentage, such as in FIG. 10, for example.

In an alternative embodiment, the user 110 can select the time period for which a subject performance chart 800 is created and displayed. As shown in FIG. 10, subject performance chart 800 also includes a week drop-down box 801 and a month drop-down box 802. By using either drop-down box, the user can limit the time period for which the subject performance chart 800 is created. Once the user 110 has selected a specific time range, user interface 120 communicates user's 110 choice to processing unit 130. Processing unit 130 retrieves the user data 112 from the storage unit 140 and generates subject performance chart 800 and communicates to the user interface 120 for display to the user 110.

If the user 110 selects the "timing performance" icon, the user interface 120 communicates the user's 110 choice to the processing unit 130. The processing unit 130 retrieves from the storage unit 140 user data 112, which contains an identification of each question answered by user 110, an indication of whether the user 110 answered each question correctly, the major topic and subtopic from which each of the questions came, and the time to answer each question. The processing unit 130 creates a timing performance chart 900 and communicates the graph to the user interface 120 for display to the user 110, such as in FIG. 11, for example. The processing unit 130 may then display a bar graph on user interface 120 as the time analysis graph with each row representing a different time segment, and the length of the bar graph representing the percentage of correct answers in each time segment.

Figure 11:
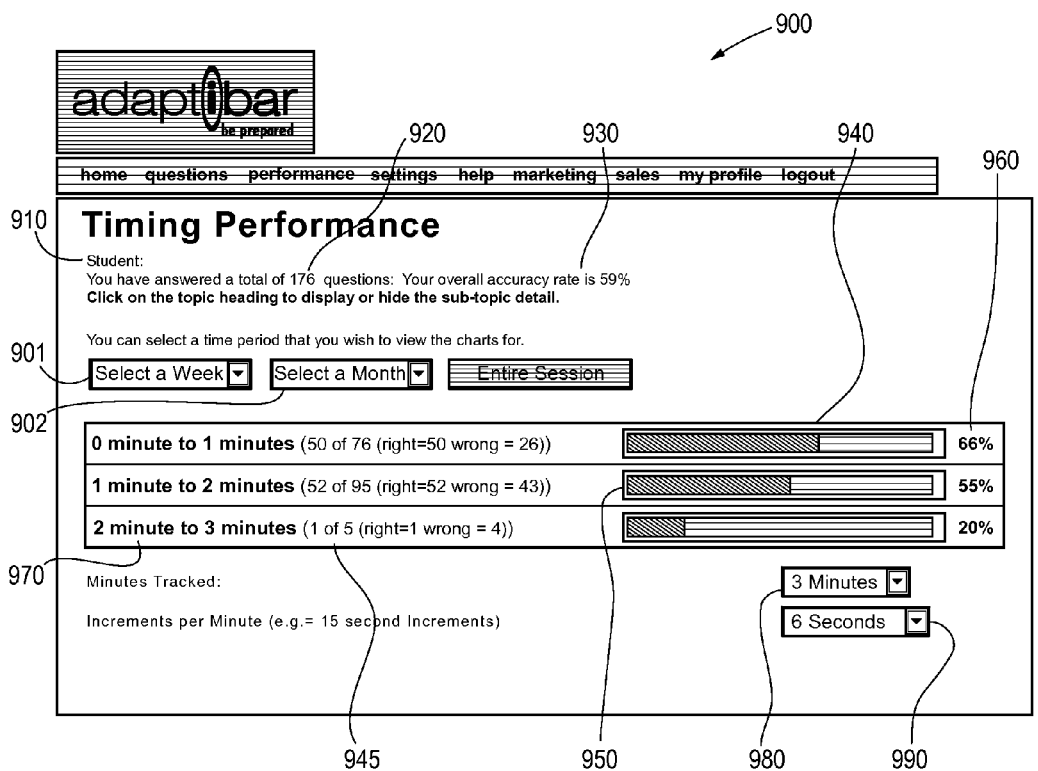
FIG. 11 depicts an example of a timing performance chart in accordance with an embodiment of the present invention.

As shown in FIG. 11, timing performance chart 900 includes a user indicator 910, a total number of questions answered indicator 920, an overall accuracy indicator 930, a graph field 940, a "minutes tracked" selector 980, and an "increments per minute" selector 990.

The user indicator 910 identifies the current user. The total number of questions answered indicator 920 displays the total number of questions answered by the user 110. The overall accuracy indicator 930 displays the overall percentage of questions answered correctly by the user 110. The graph field 940 also displays a bar graph 950 that shows the user's 110 performance for increment of time 970, a verbal description of accuracy 945, and a percentage of questions answered correctly in each time increment indicator 960.

In an embodiment, the timing performance chart 900 displays several options for the user 110 to choose from through the user interface 120. The user 110 may choose different time increments 970. For example, as shown in FIG. 11, the timing performance chart 900 displays the percentage of questions answered correctly when the answer time is between 0 minute to 1 minute, 1 minute to 2 minutes, and 2 minutes to 3 minutes.

The user 110 can change the time increments 970 displayed by the timing performance chart 900 by selecting different intervals through the "minutes tracked" selector 980. For example, the user 110 can select 4 minutes using the "minutes tracked" selector and the processing unit 130 creates a new timing performance chart 900 and communicates it to the user interface 120 for display to the user 110. The new timing performance chart displays the percentage of questions answered correctly when the answer time is between 0 minute to 1 minute, 1 minute to 2 minutes, 2 minutes to 3 minutes, and 3 to 4 minutes.

Using the "increments per minute" selector 990, the user 110 can break down each time increment into different increments per minute. For example, a minute increment can be broken down into 6, 10, 15, and 30 seconds increments.

In an alternative embodiment, the user 110 can select the time period for which a timing performance chart 900 is created and displayed. As shown in FIG. 11, timing performance chart 900 also includes a week drop-down box 901 and a month drop-down box 902. By using either drop-down box, the user can limit the time period for which the timing performance chart 900 is created. Once the user 110 has selected a specific time range, user interface 120 communicates user's 110 choice to processing unit 130. Processing unit 130 retrieves the user data 112 from the storage unit 140 and generates timing performance chart 900 and communicates to the user interface 120 for display to the user 110.

Figure 16:
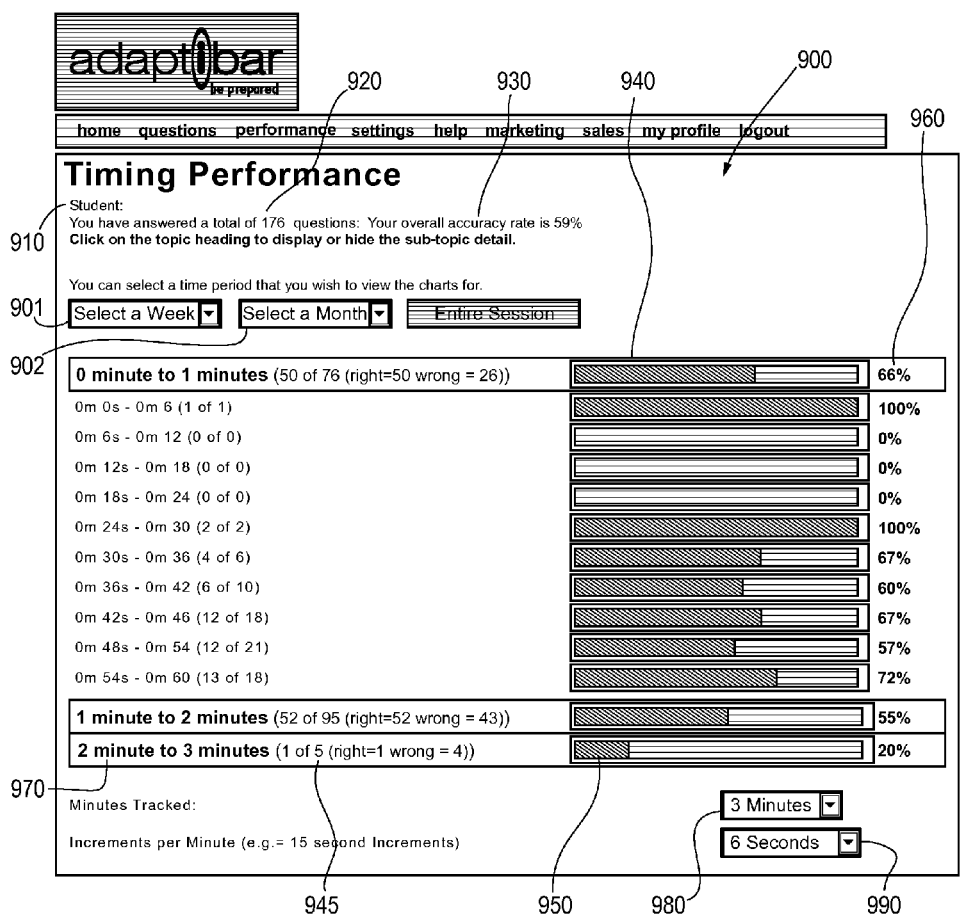
FIG. 16 depicts an example of a timing analysis chart in accordance with an embodiment of the present invention.

In an embodiment, the user 110 may select a time increment 970 by clicking on it. If the user 110 clicks on time increment 0 minute to 1 minute, the processing unit 130 generates a new timing performance chart 900 and communicates it to the user interface 120 for display to the user 110. For example, as shown in FIG. 16, the timing performance chart 900 displays the percentage of questions answered correctly for 6-second increments when the answer time is between 0 minute to 1 minute as shown in FIG. 16.

If the user 110 selects "timing analysis" icon, the user interface 120 communicates the user's 110 choice to the processing unit 130. The processing unit 130 retrieves from the storage unit 140 user data 112, which contains an identification of each question answered by user 110, an indication of whether the user 110 answered each question correctly, the major topic 150 and subtopic 152 from which each of the questions came, and the time to answer each question. The processing unit 130 generates a timing analysis chart 1000, which displays the user's 110 performance at set intervals in the form of a line graph. The processing unit 130 communicates the chart to the user interface 120 for display to the user 110, such as in FIG. 12, for example. This way, the user 110 may view at what point the user 110 is achieving the highest rate of accuracy. Also, see FIG. 4 and the description of FIG. 4 below for a description of how the processing unit 130 may create a timing analysis chart.

Timing analysis chart 1000 includes a user indicator 1010, a total number of questions answered indicator 1020, an overall accuracy indicator 1030, graph field 1040, an average answer time indicator 1050, an estimated completion time indicator 1060, an under examination time indicator 1070, an average amount of time when answer is correct indicator 1080, an average amount of time when answer is correct indicator 1090, a highest accuracy indicator 1100, an estimated completion time at highest rate indicator 1110, and an over/under examination time indicator 1120, an examination answer time ("EAT") line 1130, an optimal answer time ("OAT") line 1140, a trend line 1150, and time increment indicators 1160.

The user indicator 1010 identifies the current user. The total number of questions answered indicator 1020 displays the total number of questions answered by the user 110. The overall accuracy indicator 1030 displays the overall percentage of questions answered correctly by the user 110. The graph field 1040 displays a trend line 1150 that charts the user's 110 accuracy rate for 10-second time increments with % as the x-axis and time as the y-axis. In an alternative embodiment, the time increment can be any increment of time.

The average answer time indicator 1050 displays the user's 110 average time to answer each question. The user's 110 average time to answer each question is determined by calculating the average time it has taken user 110 to provide an answer to questions. The sum of all the times the user 110 has taken to answer all the questions presented during the examination preparation divided by the number of questions the user 110 has completed equals the user's 110 average time to answer each question.

The estimated completion time indicator 1060 displays the estimated time it will complete the examination based on the number of questions of the examination and the average answer time. The estimated completion time is determined by multiplying the user's 110 average answer time by the number of questions on the examination for which the user 110 is preparing.

The under examination time indicator 1070 displays the amount of time under the allotted time that the user will finish the examination. The under examination time is determined by subtracting the user's 110 estimated completion time from the time allotted for the examination for which the user 110 is preparing.

The average amount of time when answer is correct indicator 1080 displays the average time it takes the user 110 to answer when the answer provided is correct. The average amount of time when an answer is correct is determined by calculating the average time it has taken user 110 to provide a correct answer to questions. The sum of all the times the user has taken to answer all the questions answered correctly divided by the number of questions the user has completed equals the user's average amount of time to answer when answer is correct.

The average amount of time when answer is incorrect indicator 1090 displays the average time it takes the user 110 to answer when the answer provided is incorrect. The average amount of time when an answer is incorrect is determined by calculating the average time it has taken user 110 to provide a incorrect answer to questions. The sum of all the times the user has taken to answer all the questions answered incorrectly divided by the number of questions the user has completed equals the user's average amount of time to answer when answer is incorrect.

The optimal answer time ("OAT") indicator 1100 displays the time range at which the user 110 answers the highest percentage of questions correctly.

The estimated completion time at highest rate indicator 1110 displays how long it will take user to complete the given examination if the user 110 answers each question of the given examination in the range of the optimal answer time ("OAT"). The estimated completion time at highest rate is determined by multiplying the OAT by the number of questions on the examination for which the user 110 is preparing.

The over/under examination time indicator 1120 displays how many minutes over or under the allotted time that the user 110 will complete the given examination if the user 110 answers each question of the given examination in the range of the optimal answer time. The over/under examination time is determined by subtracting the estimated completion time at highest rate from the allotted time for the examination for which the user 110 is preparing.

The examination answer time ("EAT") line 1130 indicates the allotted time for each question by the entity giving the examination. The EAT may vary according to the test the user 110 is preparing for, however, the general equation is the total amount of time for the test divided by the total number of questions on the test. For example, the MBE has two sessions lasting 180 minutes each with 100 questions per session. The EAT for the MBE is 1.8 minutes because 180 divided by 100 is 1.8. If the EAT is 1.8 seconds, then the time performance graph may have a vertical line at 1.8 minutes, such as in FIG. 12, for example.

The optimal answer time line 1140 indicates the time range at which the user 110 answers the highest percentage of questions correctly. For example, if the user 110 is achieving his/her highest level of accuracy at 1.1 minutes, the processing unit may generate a vertical line on the graph field 1040 at the 1.1 minute marker. The user 110 may want to maintain an accuracy rate and timing that is at or lower than the 1.8 minute indicator line to be able to answer all the questions on the test.

The time increment indicators 1160 indicate the percentage of questions answered correctly by the user 110 at that time increment.

In another embodiment, the time performance graph may also have two lines running parallel to one another and horizontally on the graph—"Low Bar" line 1170 and "High Bar" line 1180. The lower of the two lines indicates the "Low Bar" accuracy rate 1170. The upper line indicates the "High Bar" accuracy rate 1180. The purpose of these bars is to represent to the user 110 at what level he/she should be performing. The user 110 may make it a goal to fall between the two blue lines.

Figure 12:
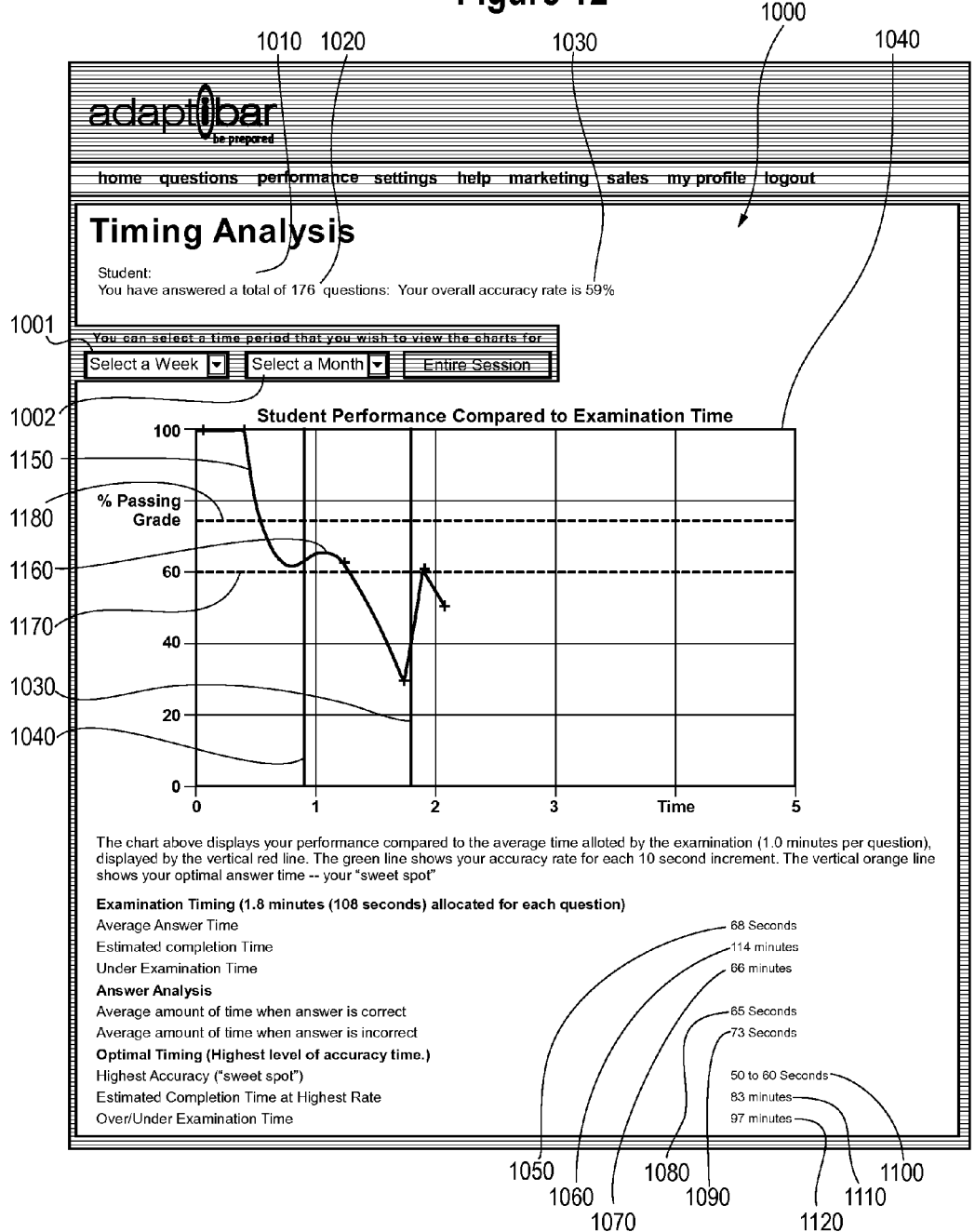
FIG. 12 depicts an example of a timing analysis chart in accordance with an embodiment of the present invention.

In an alternative embodiment, the user 110 can select the time period for which a timing analysis chart 1000 is created and displayed. As shown in FIG. 12, timing analysis chart 1000 also includes a week drop-down box 1001 and a month drop-down box 1002. By using either drop-down box, the user can limit the time period for which the timing analysis chart 1000 is created. Once the user 110 has selected a specific time range, user interface 120 communicates user's 110 choice to processing unit 130. Processing unit 130 retrieves the user data 112 from the storage unit 140 and generates the timing analysis chart 1000 and communicates to the user interface 120 for display to the user 110.

The remainder of the detailed description references users, user interfaces, processing units, and data storages. The users may be similar to user 110, for example. The user interfaces may be similar to user interface 120, for example. The processing units may be similar to processing unit 130, for example. The data storages may be similar to data storage 140, for example.

Figure 2:
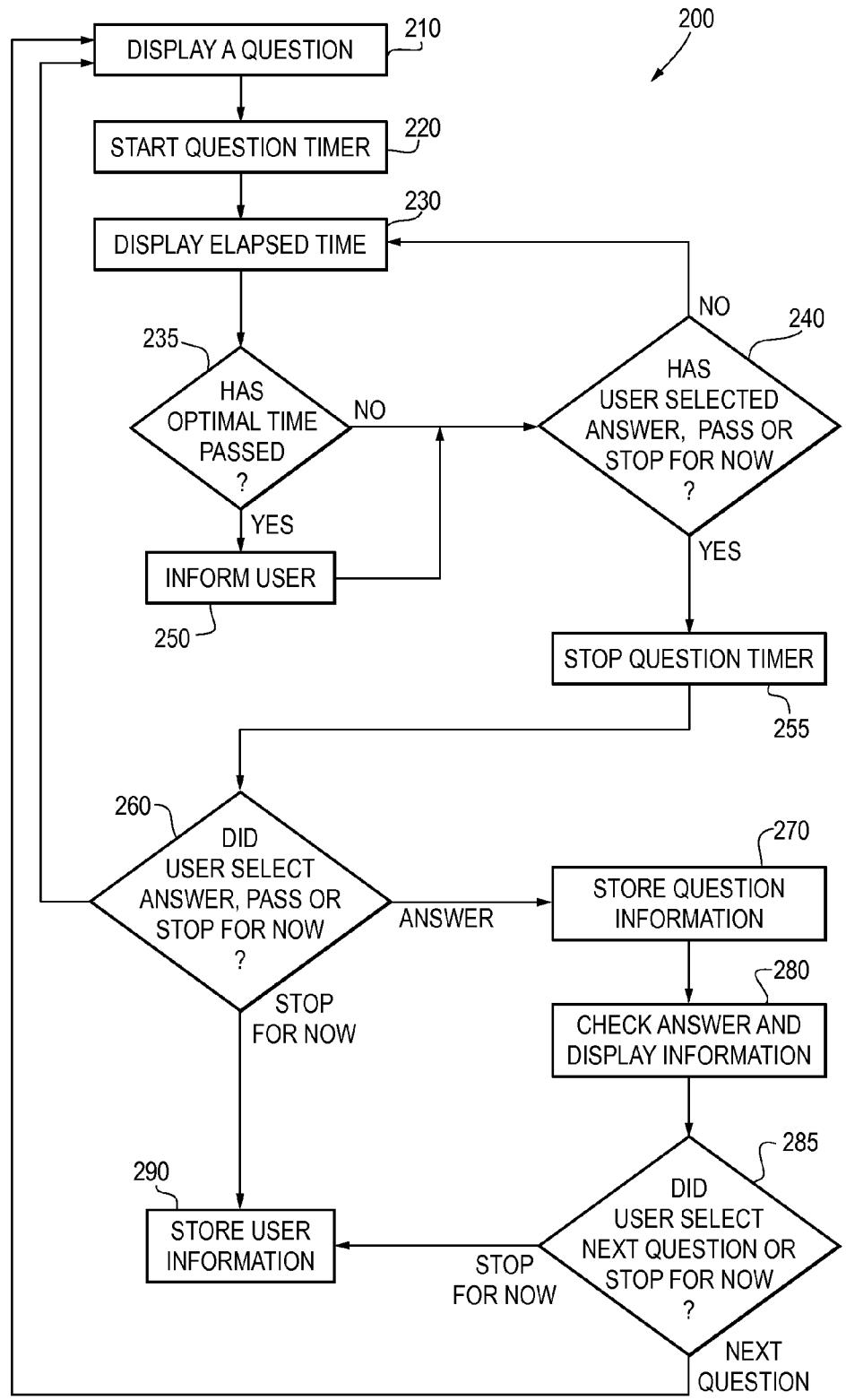
FIG. 2 illustrates a flow diagram for a method for improving performance on examinations in accordance with an embodiment of the present invention.

FIG. 2 illustrates a flow diagram 200 for a method for improving performance on examinations in accordance with an embodiment of the present invention. First, at step 210, randomly select and display a question and question answer choices from a pool of questions stored in a storage unit for the user's examination program and display a question and question answer choices to a user through a user interface. In addition to the question and question answer choices, also display the user a choice to answer the question, stop the questioning process, or pass and receive a new question. All may be displayed on a computer monitor.

In an embodiment, the displayed question 154 is randomly selected from the pool of questions 142 stored in storage unit 140 for the user's 110 examination program. The question is selected using the method for adaptive learning, which randomly selects questions for a user preparing for an examination from topics with weighted ranges, described below and in FIG. 15. For example, the processing unit 130 may randomly select and display a displayed question 154 to the user 110 through user interface 120. As described above, displayed question 154 includes a question identifier 156, text question 158, a time indicator 159, question answer choices 160*a*, 160*b*, 160*c*, and 160*d*, an "answer" icon 167, a "pass" icon 168, and a "stop for now" icon 169. The question and answer choices can be displayed question 154, which includes a question identifier 156, text question 158, a time indicator 159, question answer choices 160*a*, 160*b*, 160*c*, and 160*d*, an "answer" icon 167, a "pass" icon 168, and a "stop for now" icon 169.

In an alternative embodiment, only questions for which the user has not provided answers may be in the pool of questions 142 stored in the storage unit 140. Alternatively, the user 110 may restrict the major topic and subtopic areas from which a question is chosen. One or more storage units may store the questions, pluralities of answer choices for the questions, correct answers to the questions and explanations for the correct answer and why the remaining choices are incorrect.

Additionally, three options are presented to the user 110 through the user interface 120. The user may select "Answer," "Pass," or "Stop for Now." In order to select "Answer," the user needs to have selected one of the question answer choices 160*a* through 160*d*.

In an embodiment, after the user has answered a set number of questions, such as ten, for example, method 200 may reduce the frequency with which questions of those subtopics are selected and given to the user if the user has correctly answered a certain percentage of the questions in that subtopic, such as 75%, for example. The purpose of continuing to deliver questions in those subtopics once the user has reached a requisite level of knowledge is to prevent the user from forgetting about the subtopics that were mastered early in the studying process. The user will not unnecessarily waste time answering questions in subjects the user already knows well if questions on those topics are not asked as often.

In an embodiment, the user may be registered in the MBE program and the question may be a multiple choice question from the MBE program pool, such as in FIG. 6, for example. Preferably, the question and its answer choices are very similar to the questions and answers which actually appear on the MBE. The questions and answers may be displayed in a format and font that are very close to those used in the MBE. The closer the appearance and the format of the question and its answer to that of the MBE, the more comfortable the user may be on the actual MBE exam.

Next, at step 220, start a question timer. The timer operates to keep track of the amount of time elapsed from the time a question and answer choices are displayed to a user until the user selects and enters an answer choice.

In an embodiment, question timer 221 operates to keep track of the amount of time elapsed from the time the display question 142 is displayed to the user 110 until the user 110 selects and enters either answer choice 160a, 160b, 160c, or 160d. Due to the fact that the MBE is a severely time-limited exam—two 180 minute sessions with 100 questions each— keeping track of the user's 110 performance for each question is very important.

At step 230, display the elapsed time to the user through a user interface, such as user interface 120. The elapsed time reflects the value of the question timer at certain intervals. In an embodiment, the intervals may be tenths of a second, such as in FIG. 6, for example. Alternatively, the intervals may be seconds, minutes, hours or a fraction thereof, for example. The display of the timer may take on a multitude of forms, such as a clock face, a stopwatch, a bar graph, a digital timer, an hour glass, a dial, or some other graphical technique, for example. By displaying a visual indication of the elapsed time, the user becomes sensitized to the amount of time he/she spends on answering questions and how he/she is doing time-wise with respect to a pre-determined duration of time. Alternatively, an audio signal may be used. An audio signal has the advantage of not distracting the user visually while the user reviews the question, however, the noise may be more distracting to the user and does not allow the user to quickly check the elapsed time.

Figure 4:
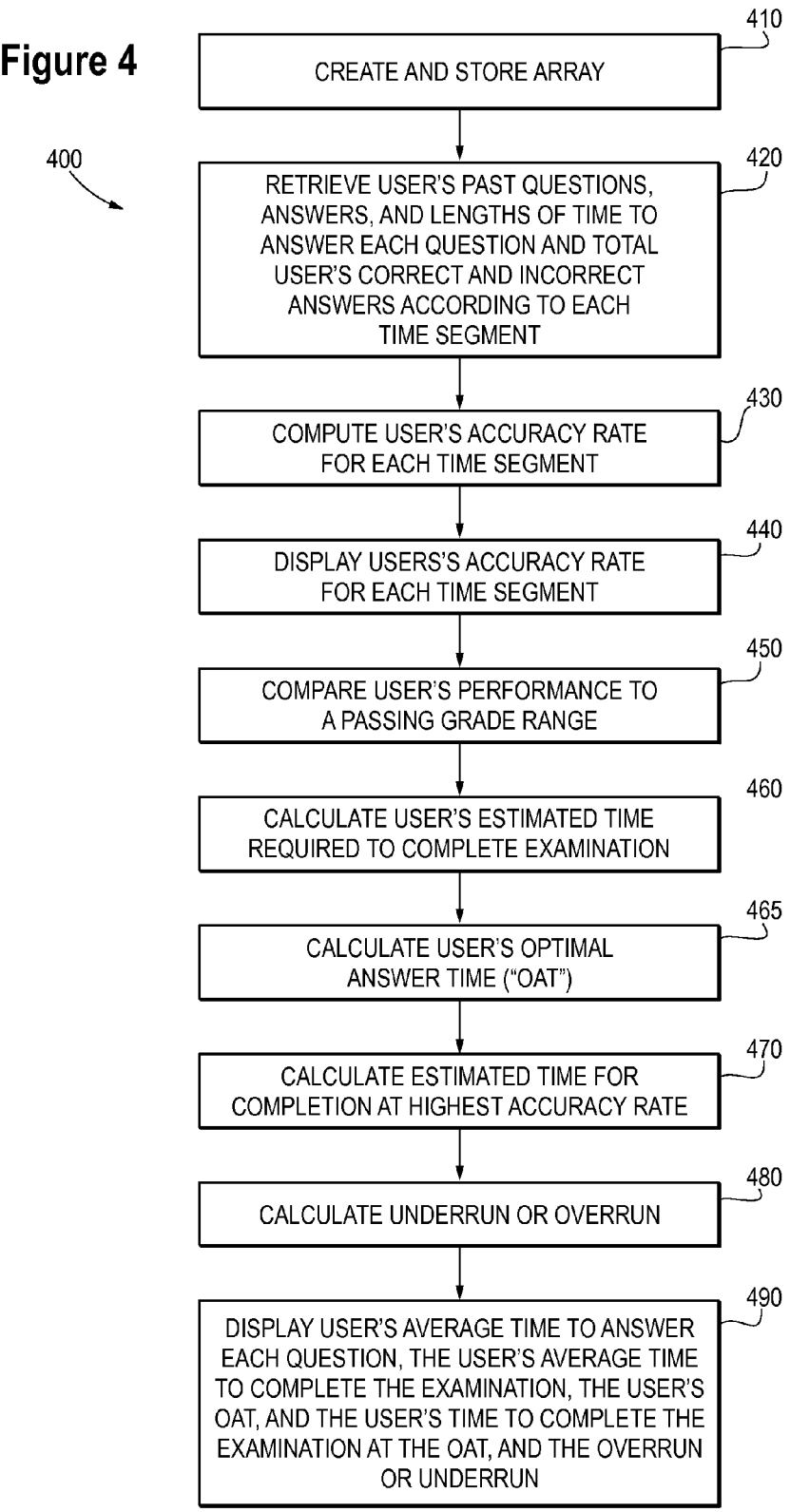
FIG. 4 illustrates a flow diagram for a method for timing analysis and benchmarking in accordance with an embodiment of the present invention.
Figure 5:
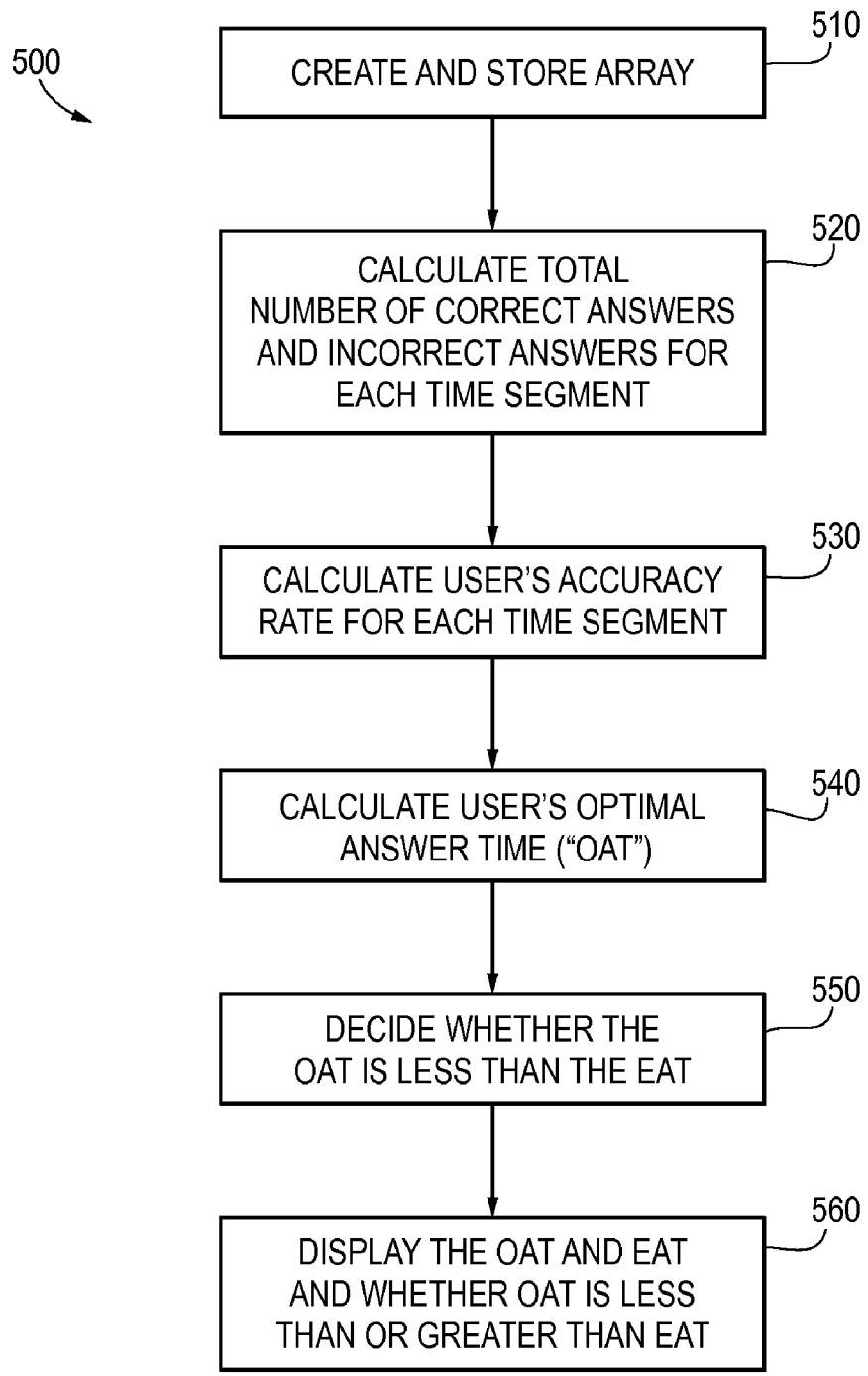
FIG. 5 illustrates a flow diagram for a method for calculating and displaying the user's optimal answer time in accordance with an embodiment of the present invention.

Next, at step 235, determine whether the user's OAT has passed. The OAT is calculated using a method for calculating and displaying the user's optimal answer time in accordance with an embodiment of the present invention, as shown in FIG. 4 and FIG. 5 and described below. If the OAT has not passed, the method 200 moves to decision 240. If the OAT has passed, the method goes on to step 250.

The decision at step 235 may act as an alarm for the user when the OAT has passed. In an alternative embodiment, decision 235 may check for a multitude of checkpoints, such as the program's EAT, a time set by the user, a checkpoint a certain length of time before or after the OAT, or other pre-determined times, for example. In that alternative embodiment, if one of the checkpoints had passed, method 200 may then go on to step 250 to inform the user.

At step 250, inform the user that the user's OAT has passed. The user may be informed or given an indication through a multitude of methods using a user interface, for example user interface 120, such as an audible noise, a message displayed to the user, a graphical representation of a traffic light signal with an illuminated red light, a stop sign, an hour glass half empty, a filled bar graph, a graphical representation of a timer, or some other some other graphical, physical or audio technique, for example. In an embodiment, the traffic light may have an illuminated green light when the question is first displayed, an illuminated yellow light when the OAT is a set time away from the then current elapsed time on the question timer, and an illuminated red light when the question timer has a time equal to or greater than the OAT.

After informing the user at step 250, method 200 goes to step 240. In an alternative embodiment, at step 250, method 200 may also inform the user when a multitude of checkpoints has passed, such as the program's EAT, a time set by the user, a checkpoint a certain length of time before or after the OAT, or other predetermined times, for example. By giving the user this type of feedback, the user, through practice, may begin to develop internal timing which may assist the user in performing better on the actual exam for which the user is preparing. Additionally, the user may not have to constantly check how much time has elapsed on the examination.

At step 240, determine whether the user has selected one of three options presented to the user: "answer," "pass," or "stop." If the user has not yet selected one of the three choices, return to step 230 and continue to display the elapsed time at a set interval. If the user has selected one of "answer," "pass," or "stop," go to step 255 and stop question timer. The question timer is stopped at this time so that only the time the user takes to answer the question is measured.

At step 260, determine whether the user selected "answer," "pass," or "stop." If the user selected "pass," go to step 210. If the user selected "stop," go to step 290. If the user selected "answer," go to step 270.

At step 270, store question information in storage. In an alternative embodiment, the question information may be stored in centralized data storage for all users. In an embodiment, question information may consist of a multitude of different information, such as the question asked, the major topic and subtopic of the question, the answer chosen, whether the answer was correct, the OAT at the time the answer was given, the date and time the answer was given, the number of total questions the user has answered at that point, the amount of time taken to answer the question, or other information about the question or the user, for example. The question information may be stored in a storage unit 140.

At step 280, compare the answer selected by the user against the correct answer stored in storage and display results to the user through a user interface. In an embodiment, step 280 displays the following to the user on a monitor, for example: whether the user's answer was correct, the explanation for the correct answer and why the other answer choices were incorrect, the elapsed time the user took to answer the question from the question timer, the difference between the OAT and the elapsed time, a suggestion as to whether the user should try to reduce or increase the time spent on answering the question, and the likely change in the user's performance should the user decide follow the suggested change in time. In an embodiment, if the user answered the question correctly, the method may not display a suggested change in time or a likely change in performance if the elapsed time for the question is less than the EAT—the average time allotted to each question in an actual examination. Alternatively, if the user answered the question correctly, the method may not display a suggested change in time or a likely change in performance if the elapsed time for the question is less than the OAT. At step 280, two choices—"stop" and "next question"—may be displayed to a user through a user interface, such as a computer monitor for example.

Then, step 285, determine if the user selected if user selected "stop" or "next question." If the user selected "next question," go to step 210. If the user selected "stop," go to step 290.

Finally, at step 290, method 200 stores the user information. The user information may include a multitude of different information, such as the number of questions the user answered, the last question the user answered, whether the user was presented a question and then elected to "pass" or to "stop," and other user information, for example. Storing the last question the user answered may allow the user to start where he/she left off the next time the user uses the program.

Figure 3:
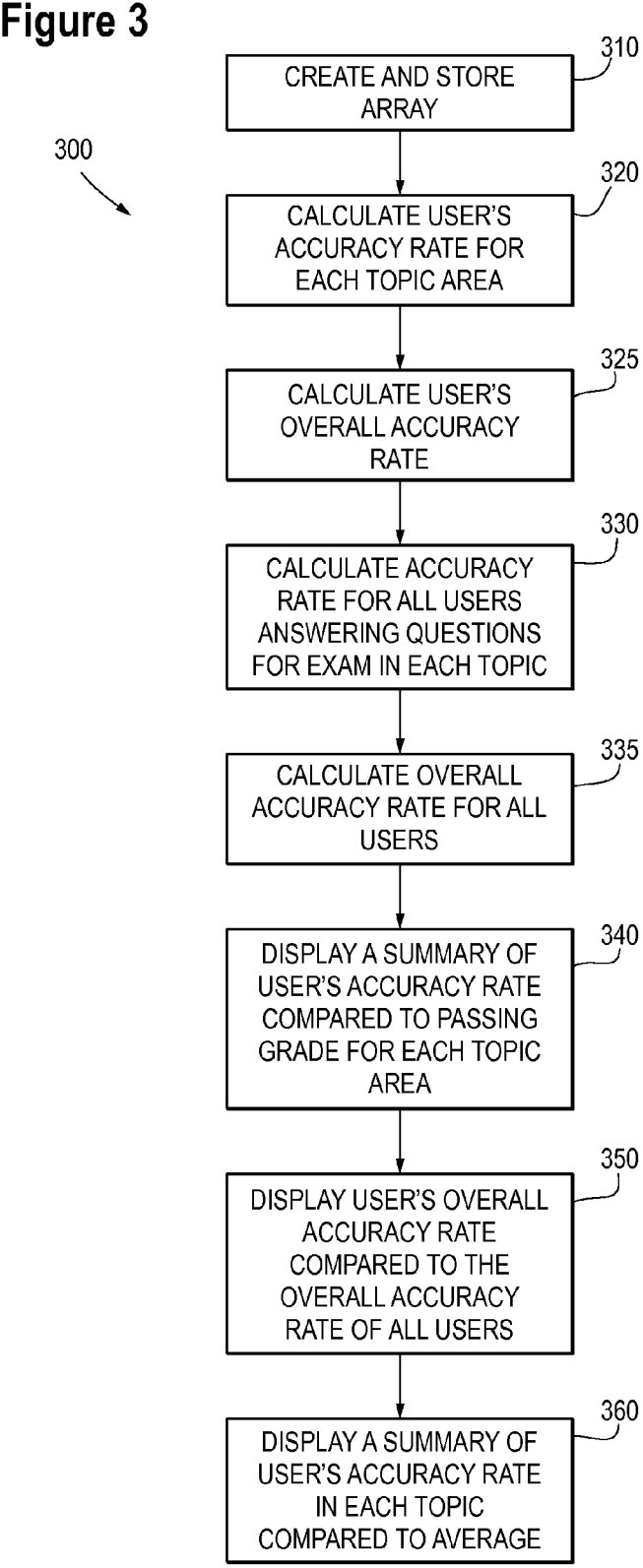
FIG. 3 depicts a flow diagram for a method for performance analysis and benchmarking in accordance with an embodiment of the present invention.

FIG. 3 illustrates a flow diagram 300 for performance analysis and benchmarking in accordance with an embodiment of the present invention, which measures a user's accuracy rate compared to passing grades and benchmarked to other users.

First, at step 310, create and store an array. The array has a number of rows equal to a number of major topic and subtopic areas in the user's preparation program.

Next, at step 320, calculate the user's accuracy rate for each topic area. The number of the user's correct answers in a particular topic area divided by the total number of questions answered by the user in that particular topic area equals the user's accuracy for that topic area.

At step 325, calculate the user's overall accuracy rate. The total number of questions answered correctly by the user divided by the total number of questions presented to the user equals the user's overall accuracy.

At step 330, calculate the accuracy rate for all users answering the questions in an examination period for each topic area. The total number of correct answers in a topic area provided in given examination period by all users divided by the number of all the answers in a topic area provided during that examination period by all users equals the accuracy rate for all users for each topic in a given examination period.

At step 335, compute the overall accuracy rate of all users for the given examination period. The total number of questions answered correctly by all users in the given examination period divided by the total number of questions presented to all users during the given examination period equals the overall accuracy rate of all users.

An examination period may last however long a preparation program is active. For example, a user (such as a student) signed up for the MBE program for the July MBE may have an examination period from April 1st of the same year to the date of the MBE in July. All users enrolled in the program may answer questions in the different topic areas of the program.

At step 340, display a summary of the user's accuracy in each topic area compared to the passing grade range for each topic area. The summary may take the form of the bar graph shown in FIG. 9. The passing grade range may be defined by a "low-bar" and a "high-bar." For example, the "low-bar" may be 60% and the "high-bar" may be 75%, and both bars may be represented by vertical lines on a subject benchmark chart, such as in FIG. 9, for example. Displaying the passing grade range may allow the user to quickly assess strengths and weaknesses across the major topic areas.

Next, at step 350, display the user's overall accuracy rate compared to the overall accuracy rate of all the users answering questions for an exam period.

Finally, at step 360, display a summary of the user's accuracy rate in each topic area compared to the average accuracy rate of all users answering questions for an exam period for the same major topics 150 and subtopics 152. For example, the average performance of all the users answering questions for an exam period may be represented by a box in each row of a topic analysis bar graph.

Steps 320, 325, 330, and 335 may be conducted simultaneously by a processing unit, such as the processing unit 130 described above.

Steps 340, 350, and 360 may also be conducted simultaneously by a processing unit, such as the processing unit 130 described above.

FIG. 4 illustrates a flow diagram 400 for a method of timing analysis and benchmarking in accordance with an embodiment of the present invention, which measures a user's accuracy rate over a range of time taken to answer a question compared to an examination answer time ("EAT") and a user's optimal answer time ("OAT"). The OAT is the time range in which the user's accuracy rate is the highest.

First, at step 410, creates and stores an array. The array has a number of rows equal to a number of time segments, plus one additional row to accumulate all answers exceeding a maximum time. A time segment may be any length of time, such as seconds, minutes, hours, or any fraction thereof, for example. The processing unit 130 may decide the appropriate time segment, or a user may select the time segment, for example. The number of time segments is determined by the maximum time the user or the processing unit chooses to display. The actual number of time segments is that maximum time divided by the length of a time segment. The array has a number of columns which hold the user's performance in each time segment.

Next, at step 420, retrieve the user's past questions, answers, and lengths of time to answer each question and total the user's correct and incorrect answers according to each time segment.

At step 430, compute the user's accuracy rate for each time segment. The number of the user's correct answers in a time segment divided by the total number of questions answered by the user in the time segment equals the user's accuracy for that given time segment.

Then, at step 440, display the user's accuracy rate for each time segment on a graph with an x-axis and a y-axis on a user interface, plotting accuracy on the x-axis and the time segments on the y-axis, such as in FIG. 12, for example.

Next, at step 450, compare the user's performance to a passing grade range. The passing grade range may be defined by a "low-bar" and a "high-bar," which may be displayed. For example, the "low-bar" may be 60% and the "high-bar" may be 75%, and both bars may be represented by horizontal lines on a time performance graph, such as in FIG. 12, for example. Displaying the passing grade range may allow the user to quickly assess the appropriate amount of time required to read and answer a question.

At step 460, calculate the user's estimated time required to complete the examination based on the user's average time to answer each question and the number of questions on the test. The sum of all the times the user has taken to answer all the questions presented during the examination preparation divided by the number of questions the user has completed equals the user's average time to answer each question. The user's average time to answer each question multiplied by the total number of questions in the examination equals the user's estimated time required to complete the examination.

At step 465, calculate the user's optimal answer time ("OAT"). The OAT is calculated by performing the following calculation: for each time segment, multiply the user's accuracy rate in that time segment by 100 and then by the total number of questions answered by the user in that time segment. Then, determine the time segment with the highest value and that time range is the user's OAT.

Then, at step 470, calculate the estimated time for completion at highest accuracy rate, which is the OAT multiplied by the total number of questions on the examination for which the user is preparing.

At step 480, calculate the underrun or overrun, which is the estimated time for completion at highest accuracy rate minus the total allotted time for the examination for which the user is preparing.

If the total allotted examination time is less than the estimated time for completion at a highest accuracy rate, then there is an overrun. An overrun reduces the available time to answer questions, lowering the user's performance rate. If an overrun occurs, the user needs to work to reduce their OAT.

If the estimated time for completion at a highest accuracy rate is less than the total allotted examination time, then this is an underrun and the user's performance should be equal to the user's highest accuracy rate. The underrun is time that may be spent reviewing questions and attaining a highest accuracy rate, thus yielding a higher accuracy rate.

At step 490, display the user's average time to answer each question, the user's average time to complete the examination, the user's OAT, and the user's time to complete the examination at the OAT, and the overrun or underrun.

FIG. 5 illustrates a flow diagram 500 for a method for calculating and displaying the user's optimal answer time in accordance with an embodiment of the present invention. First, at step 510, create and store an array. The array may be stored in storage as a virtual table. The array has a number of rows equal to a number of time segments, plus one additional row to accumulate all answers exceeding a maximum time. A time segment may be any length of time, such as seconds, minutes, hours, or any fraction thereof, for example. A processing unit may decide the appropriate time segment, or a user may select the time segment, for example. The number of time segments is determined by the maximum time the user or the processing unit chooses to display. The actual number of time segments is that maximum time divided by the length of a time segment. The array has a number of columns which hold the user's performance in each time segment.

Next, at step 520, calculate the total number of correct answers and incorrect answers for each time segment.

At step 530, calculate the user's accuracy rate for each time segment. The number of the user's correct answers given in a time segment divided by the total number of questions answered by the user in the time segment equals the user's accuracy rate for each time segment.

Then, at step 540, calculate the user's the optimal answer time ("OAT"). The OAT is calculated by performing the following calculation. For each time segment, multiply the user's accuracy rate in that time segment by 100 and then by the total number of questions answered by user in that time segment. Then, determine the time segment with the highest value and that time range is the user's OAT.

In another embodiment, a processing unit may loop through all the answers that a user has given and find the percentage of correct answers for each time segment. The highest of those percentages is the maximum accuracy rate. In an alternative embodiment, the OAT may be calculated by not only finding the accuracy rate of each time segment, but also weighing how long ago the user answered the question. A user's OAT may adjust over time. For example, if a user answers a lot of questions in five minutes before studying and then studies and is able to answer questions in one minute, the user's OAT may be too high. In another embodiment, method 500 may only consider questions answered within a certain period of time before the calculation of the OAT, or may only consider a certain number of questions answered by the user most recently. Alternatively, answers could be given a weight according to how long ago they were answered or how many questions have been answered by the user after that question. Additionally, some questions may be harder than others. Thus, in an embodiment, an answer time may be given less weight according to the percentage of users that got the answer wrong. The OAT may not be as accurate until a significant amount of answers from the user have been accumulated. That amount may depend on the user's program. In another embodiment, as a default until the user has answered a certain number of questions, the OAT may be set to the same amount as the estimated answer time ("EAT").

At step 550, decide whether the OAT is less than the EAT.

At step 560, display the OAT, EAT, and whether the OAT is greater than or less than the EAT. The OAT and EAT may be displayed on a user interface. The display may by in a multitude of forms, such as a graph, a message setting out the expected performance and the OAT, or other graphical technique, for example.

Figure 15:
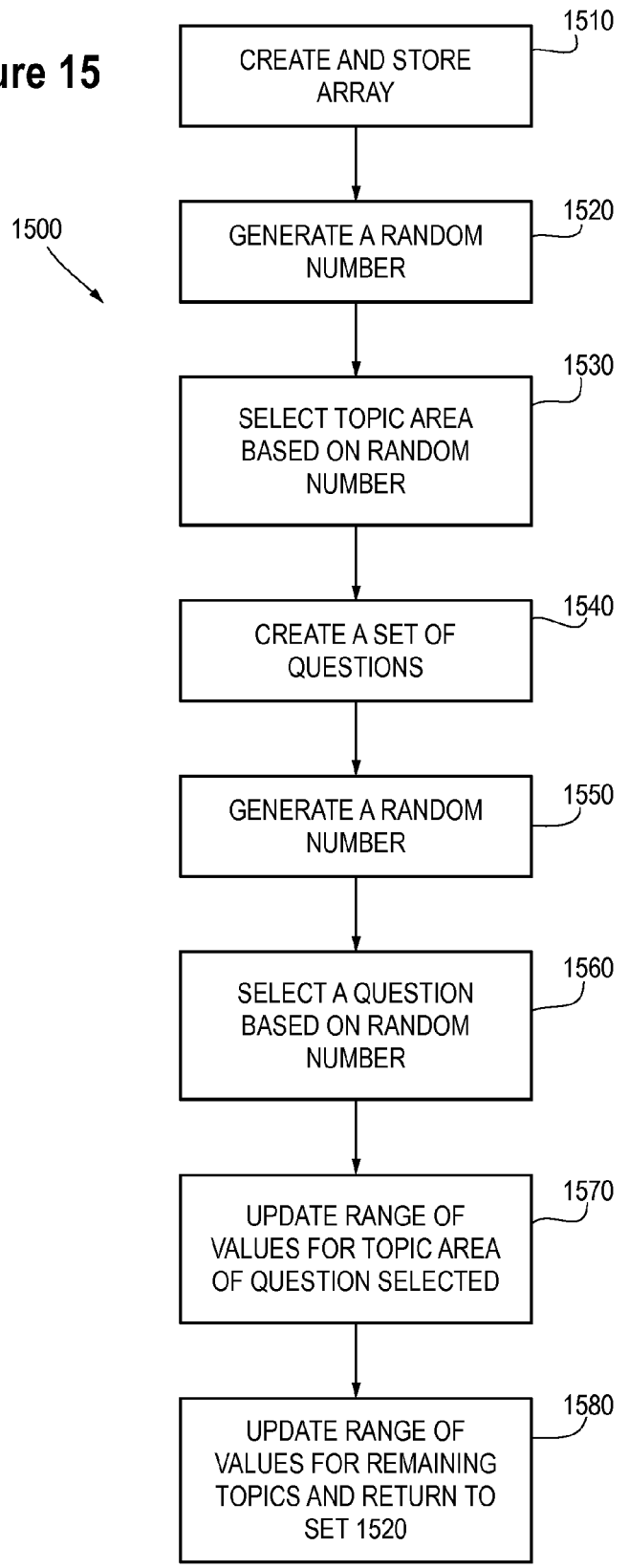
FIG. 15 illustrates a flow diagram for a method of adaptive learning used in accordance with an embodiment of the present invention

FIG. 15 illustrates a flow diagram 1500 for a method for adaptive learning in accordance with an embodiment of the present invention, which randomly selects questions for a user preparing for an examination from topics with weighted ranges.

First, at step 1510, create and store an array with the number of rows equal to the number of topics on the examination for which the user is preparing and a column value equal to a preassigned range of values. The range of values can be an equal range of values initially, such as 100, which can equal the total number questions available in each topic. For example, for an examination with six topics, topic 1 has a range of values from 1-100, topic 2 has a range of values from 101-200, topic 3 has a range of values from 201-300, topic 4 has a range of values from 301-400, topic 5 has a range of values from 401-500, and topic 6 has a range of values from 501 to 600. Therefore, the range of values is from 1 to 600.

At step 1520, generate a random number in the range of values assigned to the topic areas.

At step 1530, select the topic area by finding the value range in which the random number falls. For example, based on the values discussed in step 1510 above, if the random number 134 is generated, then select topic 2.

At step 1540, create a set of questions from the topic selected in step 1530 that have not been answered.

At step 1550, generate a random number in the range of the total number of questions in the unanswered set of questions.

At step 1560, select a question equal to the question number in the set of unanswered questions and display it to the user through the user interface.

At step 1570, update the range of values for the topic area from which the previous question was selected based on whether the user provided a correct or incorrect answer. The total number in the new range of values for a topic will be equal to the inverse proportion of the user's accuracy factor for that topic, multiplied by a weighting factor, plus a minimum value—((1−accuracy factor)*(weighting factor))+ (minimal value). The total number of correct answers provided by a user in a topic divided by the total number of questions in the topic equals the user's accuracy factor for that topic. The weighing factor determines the total range of values in each topic, where a higher weighing factor allows the random number generator to generate a number for a larger range of values. For an examination with six topics and approximately 1200 questions, the weighting factor is 80. The minimal value sets the smallest range of values allocated to each major topic in order to allow the adaptive learning method to select randomly questions from all topics, including topics in which the user is performing well. For an examination with six topics and approximately 1200 questions, the minimal value is 5.

For example, if the user answered correctly the question selected in step 1560 from topic 2, the user's accuracy factor for topic 2 would be 0.01, which is 1 divided by 100, where 1 is the total number of questions answered correctly by user from topic 2 and 100 is the total number of questions in topic 2. Applying the equation described above and using the weighting factor and minimal value described in step 1570, the total number in the new range of values for topic 2 would be 84, where ((1−0.01)*(80))+(5)=84.2. Round to the nearest whole number.

At step 1580, update the range of values for all of topics in the array. If no answer has been provided for a particular topic, allocate the maximum range of values. For example, based on steps 1510-1570. described above, topic 1 has a range of values from 1-100, topic 2 has a range of values from 101-184, topic 3 has a range of values from 185-284, topic 4 has a range of values from 285-384, topic 5 has a range of values from 385-484, and topic 6 has a range of values from 485-584.

After step 1580, return to step 1520.

The range values for each topic are reset to the preassigned range of values when all the questions have been answered.

Steps 1510 through 1580 may be performed by a processing unit, such as processing unit 130.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for selecting a question to improve examination performance, said method comprising:
    performing, with at least one processing device, at least the following:
    selecting a topic, wherein said topic is one of a plurality of available topics, wherein each topic in said plurality of available topics is associated with a weight, wherein said topic is selected based at least in part on said weight associated with said topic;
    selecting a question based on said topic, wherein said question is one of a plurality of available questions, wherein each question in said plurality of available questions is associated with at least one topic in said plurality of available topics;
    presenting said question to a particular user;
    receiving an answer to said question from said particular user;
    adjusting at least said weight associated with said topic based at least in part on said answer;
    determining the time between presenting said question to said particular user and receiving said answer from said particular user;
    repeating said presenting, said receiving, said determining for a plurality of questions to determine a plurality of response times of said particular user; and
    analyzing said plurality of response times of said particular user to determine an optimal answer time for said particular user, wherein said optimal answer time for said particular user is calculated by performing the following:
        multiplying said particular user's accuracy rate in a particular time segment by a predetermined number and then by the total number of questions answered by said particular user in said particular time segment;
        repeating said multiplying for all time segments; and
        determining a time segment with a highest value, wherein said time segment with said highest value is said optimal answer time for said particular user.

2. The method of claim 1, wherein said weight associated with said topic is increased when said answer to said question is incorrect.

3. The method of claim 1, wherein said weight associated with said topic is decreased when said answer to said question is correct.

4. The method of claim 1, wherein each weight associated with each topic in said plurality of topics is adjusted based at least in part on said answer.

5. The method of claim 1, wherein said question is randomly selected from said plurality of available questions.

6. The method of claim 1, comprising selecting a subtopic, wherein said subtopic is associated with one of said plurality of topics, wherein said question is associated with said subtopic, and wherein said question is selected based on said subtopic.

7. The method of claim 6, wherein said subtopic is associated with a subtopic weight, and further including said subtopic weight based at least in part on said answer.

8. The method of claim 1, comprising informing said particular user of said optimal answer time for said particular user.

9. The method of claim 1, comprising providing said particular user with a suggested change in an actual time taken to answer a question, wherein said suggested change in time is said optimal answer time for said particular user minus said actual time taken to answer said question by said particular user.

10. The method of claim 1, comprising, after presenting a subsequent question to said particular user, informing said particular user when said optimal answer time for said particular user has elapsed.

11. The method of claim 1, wherein said optimal answer time for said particular user is an optimal amount of time that said particular user should spend on each question.

12. The method of claim 1, wherein said optimal answer time for said particular user is a time at which said particular user achieves his/her highest level of accuracy.

13. A method for selecting a question to improve examination performance, said method comprising:
    performing, with at least one processing device, at least the following:
    selecting a topic, wherein said topic is one of a plurality of available topics;
    selecting a question based on said topic, wherein said question is one of a plurality of available questions, wherein each question in said plurality of available questions is associated with at least one topic in said plurality of available topics;
    presenting said question to a particular user;

receiving an answer to said question from said particular user;

determining the time between presenting said question to said particular user and receiving said answer from said particular user;

repeating said presenting, said receiving, said determining for a plurality of questions to determine a plurality of response times of said particular user;

analyzing said plurality of response times of said particular user to determine an optimal answer time for said particular user, wherein said optimal answer time for said particular user is calculated by performing the following:

multiplying said particular user's accuracy rate in a particular time segment by a predetermined number and then by the total number of questions answered by said particular user in said particular time segment, repeating said multiplying for all time segments, and determining a time segment with a highest value, wherein said time segment with said highest value is said optimal answer time for said particular user;

after presenting a subsequent question to said particular user, informing said particular user of said optimal answer time for said particular user;

providing said particular user with a suggested change in an actual time taken to answer a question by said particular user, wherein said suggested change in time is said optimal answer time for said particular user minus said actual time taken to answer said question by said particular user; and informing said particular user when said optimal answer time for said particular user has elapsed.

14. The method of claim 13, wherein each topic in said plurality of available topics is associated with a weight, wherein said topic is selected based at least in part on said weight associated with said topic; and wherein said weight associated with said topic is increased when said answer to said question is incorrect.

15. The method of claim 14, wherein said weight associated with said topic is decreased when said answer to said question is correct.

16. The method of claim 14, wherein each weight associated with each topic in said plurality of topics is adjusted based at least in part on said answer.

17. The method of claim 13, wherein said question is randomly selected from said plurality of available questions.

18. The method of claim 13, comprising selecting a subtopic, wherein said subtopic is associated with one of said plurality of topics, wherein said question is associated with said subtopic, and wherein said question is selected based on said subtopic.

19. The method of claim 18, wherein said subtopic is associated with a subtopic weight, and further including said subtopic weight based at least in part on said answer.

20. The method of claim 13, wherein said optimal answer time for said particular user is an optimal amount of time that said particular user should spend on each question.

21. The method of claim 13, wherein said optimal answer time for said particular user is a time at which said particular user achieves his/her highest level of accuracy.

* * * * *